US008507398B2

(12) United States Patent
Meca et al.

(10) Patent No.: US 8,507,398 B2
(45) Date of Patent: Aug. 13, 2013

(54) CATALYSTS FOR METATHESIS REACTIONS

(75) Inventors: Ludek Meca, Zürich (CH); Lubica Triscikova, Zürich (CH); Heinz Berke, Salenstein (CH); Kirsten Langfeld, Neuhausen (DE); Martin Schneider, München (DE); Oskar Nuyken, München (DE); Werner Obrecht, Moers (DE)

(73) Assignee: LANXESS Deutschland GmbH, Leverkusen (DE)

( * ) Notice: Subject to any disclaimer, the term of this patent is extended or adjusted under 35 U.S.C. 154(b) by 676 days.

(21) Appl. No.: 12/193,457

(22) Filed: Aug. 18, 2008

(65) Prior Publication Data
US 2009/0076226 A1  Mar. 19, 2009

(30) Foreign Application Priority Data

Aug. 21, 2007  (DE) .......................... 10 2007 039 527
Aug. 22, 2007  (DE) .......................... 10 2007 039 695

(51) Int. Cl.
C08C 19/08 (2006.01)
B01J 31/12 (2006.01)
C08F 4/80 (2006.01)

(52) U.S. Cl.
USPC ........... 502/155; 502/152; 502/213; 502/222; 502/230; 556/136; 556/137; 556/22; 548/103; 548/108; 528/485; 526/171; 525/329.1; 525/329.3; 525/370

(58) Field of Classification Search
USPC ......... 502/152, 155, 213, 222, 230; 556/136, 556/137, 22; 548/103, 108; 528/485; 526/171; 525/329.1, 329.3, 370
See application file for complete search history.

(56) References Cited

U.S. PATENT DOCUMENTS

| | | | |
|---|---|---|---|
| 3,700,637 A | 10/1972 | Finch, Jr. ..................... | 260/83.3 |
| 4,464,515 A | 8/1984 | Rempel et al. ................ | 525/338 |
| 4,503,196 A | 3/1985 | Rempel et al. ................ | 525/338 |
| 4,581,417 A | 4/1986 | Buding et al. ................. | 525/338 |
| 4,631,315 A | 12/1986 | Buding et al. ................. | 525/338 |
| 4,746,707 A | 5/1988 | Fiedler et al. ................. | 525/338 |
| 4,795,788 A | 1/1989 | Himmler et al. .............. | 525/338 |
| 4,812,528 A | 3/1989 | Rempel et al. ................ | 525/338 |
| 4,978,771 A | 12/1990 | Fiedler et al. ................. | 558/459 |
| 5,728,917 A | 3/1998 | Grubbs et al. ................. | 585/653 |
| 5,831,108 A | 11/1998 | Grubbs et al. ................. | 556/21 |
| 6,403,802 B1 | 6/2002 | Nolan et al. ................... | 548/103 |
| 6,610,626 B2 | 8/2003 | Grubbs et al. ................. | 502/155 |
| 6,613,910 B2 | 9/2003 | Grubbs et al. ................. | 548/103 |
| 6,683,136 B2 | 1/2004 | Guo et al. .................... | 525/329.3 |
| 6,867,303 B2 | 3/2005 | Grela ........................... | 548/101 |
| 7,205,424 B2 | 4/2007 | Nolan ........................... | 556/136 |
| 7,329,758 B1 | 2/2008 | Grubbs et al. ................. | 548/103 |
| 2001/0039360 A1 | 11/2001 | Grubbs et al. ................. | 556/136 |
| 2002/0107138 A1 | 8/2002 | Hoveyda et al. .............. | 502/152 |
| 2003/0100776 A1 | 5/2003 | Grubbs et al. ................. | 549/513 |
| 2003/0236427 A1 | 12/2003 | Grubbs et al. ................. | 558/238 |

FOREIGN PATENT DOCUMENTS

| | | |
|---|---|---|
| DE | 25 39 132 | 3/1977 |
| EP | 0 471 250 | 2/1992 |
| WO | 97/06185 | 2/1997 |
| WO | 2004/112951 | 12/2004 |

OTHER PUBLICATIONS

Furstner et al., Chem. Eur. J. 6 (2000) 1847-1857.*
Del Zotto et al., Inorg. Chim. Acta 349 (2003) 249-252.*
Dixneuf, H. et al; "Allenylidene-to-Indenylidene Rearrangement in Arene-Ruthenium Complexes: A Key Step to Highly Active Catalysts for Olefin Methathesis Reactions", J. AM. Chem. Soc. 2006, 128, 4079-4089.
Fürstner, A. et al; "Cationic Rutheniu, Allenylidene Complexes as Catalysts for Ring Closing Olefin Metathesis", Chem. Eur. J. 2000, 6, Nr. 10, 1847-1857.
Dixenuf, H. et al; "Synthesis of Di- and Monosubstituted Allenylidene-Ruthenium [(Ph$_2$PCH$_2$PPh$_2$)$_2$ClRu=C=C=C(Y)R]PF$_6$ and Acetylide Complexes by Activitation of Prop-2-yn-1-ols". Organometallics 1995, 14, 4920-4928.
Del Zotto, A. et al; [RuCl($\eta^6$-C$_5$H$_5$(PPh$_3$)$_2$] as catalyst in the reaction of primary amines with diaryl Diazoalkanes: unexpected formation of Ar$_2$C=NR Compounds. Inorganica Chimica Acta 349 (2003), 249-252.
Pfeiffer, Juergen et al: "Reactions of Complex Ligands. Part 79. Diarylcarbene Complexes of Chromium from Diazo Precursors: Synthesis and Reaction with Electron-Rich Alkynes"; Organometallics, 17 (20), 4353-4361 1998 XP-002496808.
Schneider, Sabine K. et al; "Pyridin—Quinolin—and Acridinylidene Palldium Carbene Complexes as Highly Efficient C-C Coupling Catalysts"; Advanced Synthesis & Catalysis, 348(14), 1862-1873 XP-002496809, 2006.
Platinum Metals Rev., 2005, 49(3), 123-137; Dragutan et al; "Ruthenium Complexes Bearing N-Heterocyclic Carbene (NHC) Ligands".
Chem. Eur. J. 2001, 7, No. 22, 4811-4820; Furstner et al; Indenylidene Complexes of Ruthenium: Optimized Synthesis, Structure Elucidation, and Performance as Cataysts for Olefin Metathesis-Application to the Synthesis of the ADE-Ring System of Nakadomarin A.
Harlow et al, J. Chem. Soc., Dalton Trans. 1999, 285-291; The first co-ordinatively unsaturated Group 8 allenylidene complexes: insights into Grubbs' vs. Dixneuf-Furstner olefin metathesis catalysts.
J. Org. Chem., 1999, 64, 8275-8280; Furstner et al; "Total Synthesis and Structural Refinement of the Cyclic Tripyrrole Pigment Nonylprodigiosin".
J. Am. Chem. Soc. 1995, 117, 11027-11028; Arduengo, III, Goerlich and Marshall; "A Stable Diaminocarbene".
Angew. Chem. Int. Ed. 2002, 41(21), 4035-4037; Love, Morgan, Trnka Grubbs; "A Practical and Highly Active Ruthenium-Based Catalyst that Effects the Cross Metathesis of Acrylonitrile".
Van Galen et al, J. Org. Chem., 1986, 51, 2544-2550 "The Electrochemical Reduction of Fluorenone Tosythydrazone: Evidence Consistent with the Formation of the Tosyl Nitrene Anion Radical".
A. Jonczyk, J. Wlostowska, Synth. Commun. 1978, 8, 569-572; "A Simple Method for Generation of Diazocompounds in an Aqueous Two-Phase System".

* cited by examiner

Primary Examiner — Roberto Rabago
(74) Attorney, Agent, or Firm — Nicanor A. Kohncke

(57) ABSTRACT

Catalysts for metathesis reactions, in particular for the metathesis of nitrile rubber, are provided.

26 Claims, 5 Drawing Sheets

*Structure AA. Structure of the compound 1.*

Structure BB. Structure of the compound 3.

Structure CC. Structure of the compound 4.

*Structure DD. Structure of the compound 5.*

*Structure EE. Structure of the compound 6.*

CATALYSTS FOR METATHESIS REACTIONS

FIELD OF THE INVENTION

The present invention relates to transition metal-carbene complex catalysts, their preparation and their use for the catalysis of metathesis reactions, in particular for the metathesis of nitrile rubber.

BACKGROUND OF THE INVENTION

Metathesis reactions are widely used in chemical syntheses, e.g. in the form of ring-closing methatheses (RCM), cross metatheses (CM), ring-opening metatheses (ROM), ring-opening metathesis polymerizations (ROMP), cyclic diene metathesis polymerizations (ADMET), self-metathesis, reaction of alkenes with alkynes (enyne reactions), polymerization of alkynes and olefinization of carbonyls (WO-A-97/06185 and Platinum Metals Rev., 2005, 49(3), 123-137). Metathesis reactions are employed, for example, for the synthesis of olefins, for ring-opening polymerization of norbornene derivatives, for the depolymerization of unsaturated polymers and for the synthesis of telechelic polymers.

In known metal-carbene complexes, the carbene radical has a wide variety of structures. WO-A-96/04289 and WO-A-97/06185 disclose, for example, metathesis catalysts having the following in-principle structure:

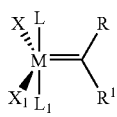

where M is osmium or ruthenium, R and $R^1$ are organic radicals having a wide range of structures, X and $X_1$ are anionic ligands and L and $L_1$ are uncharged electron donors. In the literature, the customary term "anionic ligands" in such metathesis catalysts refer to ligands which, when viewed separately from the metal centre, are negatively charged for a closed electron shell.

One specific representative of this class of compounds is the compound known as "Grubbs (I) catalyst":

Grubbs (I) catalyst

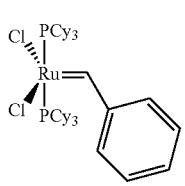

Furthermore, WO-A-00/71554 discloses a group of catalysts which are referred to in the art as "Grubbs (II) catalysts".

Grubbs (II) catalyst

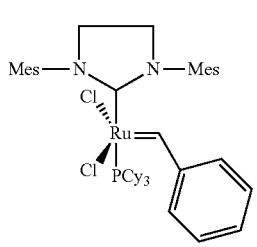

US 2002/0107138 A1 discloses further metathesis catalysts of the type depicted below, which are also referred to in the literature as "Hoveyda catalyst".

Hoveyda catalyst

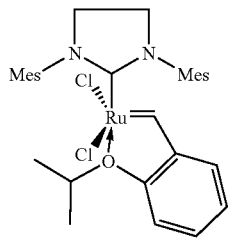

WO-A-2004/035596 discloses further metathesis catalysts of the type depicted below, which are also referred to in the literature as "Grela catalyst".

Grela catalyst

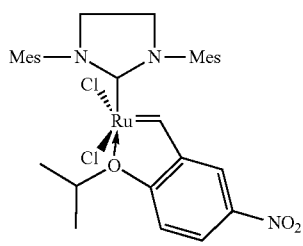

Furthermore, WO-A-03/011455 discloses hexacoordinated complex catalysts which are known under the name "Grubbs (III) catalysts".

Grubbs (III) catalyst

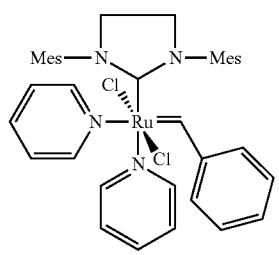

In addition, catalysts in which the two substituents located on the carbon atom of the carbene radical are bridged are known.

Hill-Fürstner catalyst

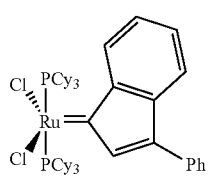

-continued

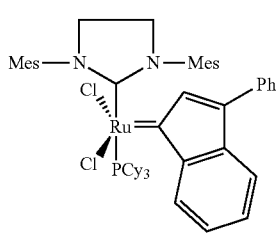

Nolan catalyst

According to Fürstner et al. (Chem. Eur. J. 2001, 7, No 22, 4811-4820), the first representative of the abovementioned class of compounds were prepared by Hill et al. (K. J. Harlow, A. F. Hill, J. D. E. T. Wilton-Ely, J. Chem. Soc. Dalton Trans. 1999, 285-291), who initially assigned an inappropriate structure to the reaction product. The correct structure was assigned by Fürstner et al. (J. Org. Chem. 1999, 64, 8275-8280). This catalyst is that referred to above as Hill-Fürstner catalyst. Derivatives of this catalyst which contain an NHC ligand in place of the phosphine ligand were described by Nolan in WO-A-00/15339. These derivatives described by Nolan are also suitable as starting material for the synthesis of further ruthenium-carbene complexes by cross metathesis (WO-A-2004/112951)

US-A-2003/0100776 describes, on page 8, paragraph [0087], catalysts which have a carbene ligand in which the radicals $R^1$ and $R^2$ are bridged, with the resulting cyclic group being able to be aliphatic or aromatic and contain substituents or heteroatoms. It is stated that this cyclic group typically has from 4 to 12, preferably from 5 to 8, ring atoms. Explicit examples of such cyclic groups are not described or made obvious.

Other catalysts in which the two substituents located on the carbon atom of the carbene radical are bridged are not known at present.

WO-A-97/06185 describes, on page 7, lines 39-40, an unsuccessful attempt by Grubbs to react $RuCl_2(=CHR)(PPh_3)_2$ with 9-diazafluorene. He states that "however, no reaction was observed with diphenyldiazomethane or 9-diazafluorene at RT".

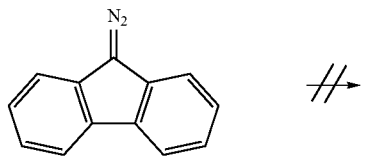

Owing to the many possible uses, there continues to be a great demand for new catalysts for metathesis reactions.

According to the present invention, it has surprisingly been found that novel transition metal complex catalysts which have a fluorenyl ligand and can be used as catalysts for metathesis reactions can be synthesized when specific reaction parameters are adhered to.

SUMMARY OF THE INVENTION

The invention provides ruthenium- or osmium-carbene complex catalysts which comprise the general structural element (I), where the carbon atom denoted by "*" is bound via one or more double bonds to the catalyst skeleton

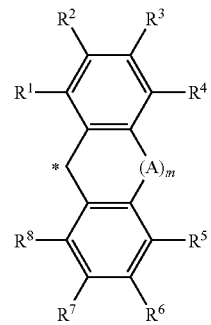

and
$R^1$-$R^8$ are identical or different and are each hydrogen, halogen, hydroxyl, aldehyde, keto, thiol, $CF_3$, nitro, nitroso, cyano, thiocyano, isocyanato, carbodiimide, carbamate, thiocarbamate, dithiocarbamate, amino, amido, imino, silyl, sulphonate (—$SO_3^-$), —$OSO_3^-$, —$PO_3^-$ or $OPO_3^-$ or alkyl, cycloalkyl, alkenyl, alkynyl, aryl, carboxylate, alkoxy, alkenyloxy, alkynyloxy, aryloxy, alkoxycarbonyl, alkylamino, alkylthio, arylthio, alkylsulphonyl, alkylsulphinyl, dialkylamino, alkylsilyl or alkoxysilyl, where these radicals may each optionally be substituted by one or more alkyl, halogen, alkoxy, aryl or heteroaryl radicals or alternatively two directly adjacent radicals from the group $R^1$-$R^8$ together with the ring carbons to which they are bound form, by bridging, a cyclic group, preferably an aromatic system, or alternatively $R^8$ is, if appropriate, bridged to another ligand of the ruthenium- or osmium-carbene complex catalyst,
m is 0 or 1 and
A is oxygen, sulphur, $C(R^9R^{10})$, N—$R^{11}$, —$C(R^{12})$=$C(R^{13})$—, —$C(R^{12})(R^{14})$—$C(R^{13})(R^{15})$—, where $R^9$-$R^{15}$ are identical or different and can each have one of the meanings of the radicals $R^1$-$R^8$.

DETAILED DESCRIPTION OF THE INVENTION

Figure 1:
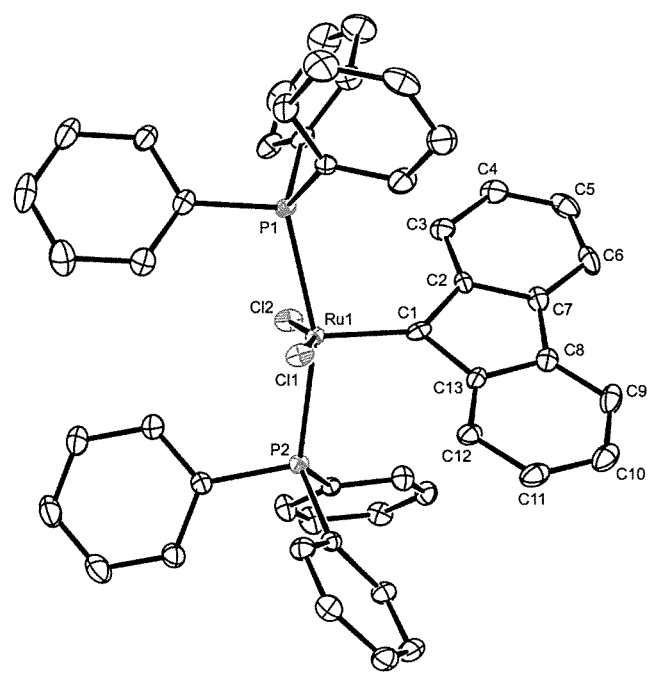
FIG. 1 Structure AA shows the x-ray crystal structure view of the compound 1.

For the purposes of the present patent application and invention, all general or preferred definitions of radicals, parameters or explanations mentioned above or in the following can be combined in any way with one another, i.e. also between the respective ranges and preferred ranges.

The term "substituted" used in the context of the present patent application in connection with the various types of metathesis catalysts means that a hydrogen atom on the radical or atom indicated has been replaced by one of the groups indicated in each case, with the proviso that the valency of the atom indicated is not exceeded and the substitution leads to a stable compound.

The catalysts of the invention comprise the structural elements of the general formula (I), with the carbon atom denoted by "*" being bound via one or more double bonds to the catalyst skeleton. If the carbon atom denoted by "*" is bound via two or more double bonds to the catalyst skeleton, these double bonds can be cumulated or conjugated.

The catalysts of the invention having a structural element of the general formula (I) thus include, for example, those of the general formulae (IIa) and (IIb),

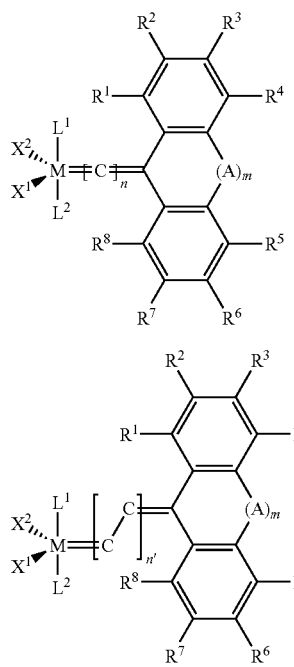

where
M is ruthenium or osmium,
$X^1$ and $X^2$ are identical or different and are two ligands, preferably anionic ligands,
$L^1$ and $L^2$ are identical or different ligands, preferably uncharged electron donors, where $L^2$ can alternatively also be bridged by the radical $R^8$,
n is 0, 1, 2 or 3, preferably 0, 1 or 2,
n' is 1 or 2, preferably 1, and
$R^1$-$R^8$, m and A have the same meanings as in the general formula (I).

In the case of the catalysts according to the invention having the general formula (IIa), the structural element of the general formula (I) is bound via a double bond (n=0) or via 2, 3 or 4 cumulated double bonds (in the case of n=1, 2 or 3) to the central metal of the complex catalyst. In the case of catalysts according to the invention having the general formula (IIb), the structural element of the general formula (I) is bound via conjugated double bonds to the metal of the complex catalyst. In both cases, there is a double bond on the carbon atom denoted by "*" in the direction of the central metal of the complex catalyst.

The catalysts of the abovementioned general formulae (IIa) and (IIb) thus encompass catalysts in which the following general structural elements (III)-(IX)

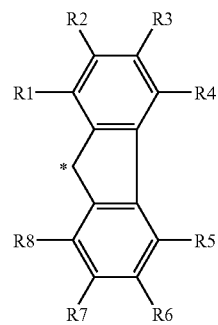

(III)

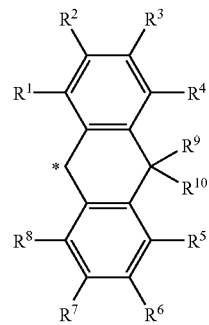

(IV)

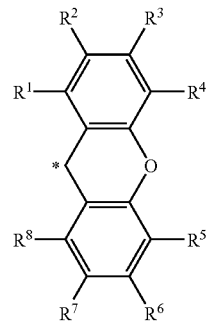

(V)

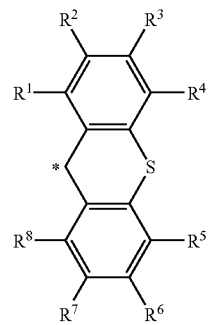

(VI)

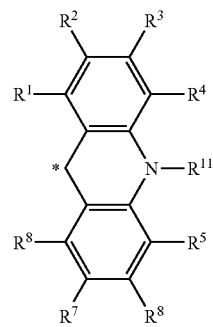

(VII)

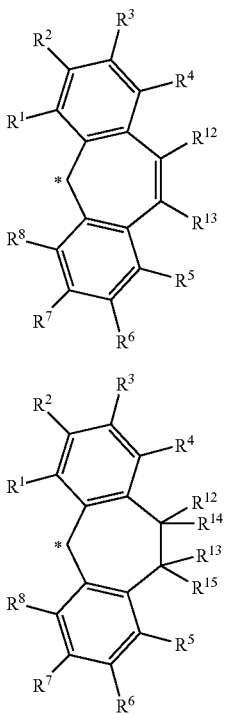

are bound via the carbon atom denoted by "*" via one or more double bonds to the catalyst skeleton of the general formula (Xa) or (Xb)

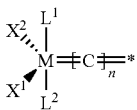

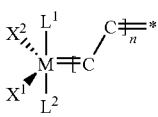

where $X^1$ and $X^2$, $L^1$ and $L^2$, n, n' and $R^1$-$R^{15}$ have the meanings mentioned for the general formulae (IIa) and (IIb).

The ruthenium- or osmium-carbene catalysts of the invention are typically pentacoordinated:

In the structural element of the general formula (I), $R^1$-$R^8$ are identical or different and are each hydrogen, halogen, hydroxyl, aldehyde, keto, thiol, $CF_3$, nitro, nitroso, cyano, thiocyano, isocyanato, carbodiimide, carbamate, thiocarbamate, dithiocarbamate, amino, amido, imino, silyl, sulphonate (—$SO_3^-$), —$OSO_3^-$, —$PO_3^-$ or $OPO_3^-$ or alkyl, preferably $C_1$-$C_{20}$-alkyl, in particular $C_1$-$C_6$-alkyl, cycloalkyl, preferably $C_3$-$C_{20}$-cycloalkyl, in particular $C_3$-$C_8$-cycloalkyl, alkenyl, preferably $C_2$-$C_{20}$-alkenyl, alkynyl, preferably $C_2$-$C_{20}$-alkynyl, aryl, preferably $C_6$-$C_{24}$-aryl, in particular phenyl, carboxylate, preferably $C_1$-$C_{20}$-carboxylate, alkoxy, preferably $C_1$-$C_{20}$-alkoxy, alkenyloxy, preferably $C_2$-$C_{20}$-alkenyloxy, alkynyloxy, preferably $C_2$-$C_{20}$-alkynyloxy, aryloxy, preferably $C_6$-$C_{24}$-aryloxy, alkoxycarbonyl, preferably $C_2$-$C_{20}$-alkoxycarbonyl, alkylamino, preferably $C_1$-$C_{30}$-alkylamino, alkylthio, preferably $C_1$-$C_{30}$-alkylthio, arylthio, preferably $C_6$-$C_{24}$-arylthio, alkylsulphonyl, preferably $C_1$-$C_{20}$-alkylsulphonyl, alkylsulphinyl, preferably $C_1$-$C_{20}$-alkylsulphinyl, dialkylamino, preferably di($C_1$-$C_{20}$-alkyl)amino, alkylsilyl, preferably $C_1$-$C_{20}$-alkylsilyl, or alkoxysilyl, preferably $C_1$-$C_{20}$-alkoxysilyl, radicals, where these radicals may all optionally be substituted by one or more alkyl, halogen, alkoxy-, aryl- or heteroaryl radicals, or alternatively two directly adjacent radicals from the group of $R^1$-$R^8$ together with the ring carbons to which they are bound may also form a cyclic group, preferably an aromatic system, by bridging or alternatively $R^8$ may optionally be bridged to another ligand of the ruthenium- or osmium-carbene complex catalyst, m is 0 or 1 and A is oxygen, sulphur, $C(R^9)(R^{10})$, N—$R^{11}$, —$C(R^{12})$=$C(R^{13})$ or —$C(R^{12})(R^{14})$ $C(R^{13})(R^{15})$—, where $R^9$-$R^{15}$ are identical or different and can each have the same preferred meanings as the radicals $R^1$-$R^8$.

$C_1$-$C_6$-alkyl is, for example, methyl, ethyl, n-propyl, isopropyl, n-butyl, sec-butyl, tert-butyl, n-pentyl, 1-methylbutyl, 2-methylbutyl, 3-methylbutyl, neopentyl, 1-ethylpropyl or n-hexyl.

$C_3$-$C_8$-cycloalkyl encompasses cyclopropyl, cyclobutyl, cylopentyl, cyclohexyl, cycloheptyl and cyclooctyl.

$C_6$-$C_{24}$-aryl encompasses an aromatic radical having from 6 to 24 skeletal carbon atoms. As preferred monocyclic, bicyclic or tricyclic carbocyclic aromatic radicals having from 6 to 10 skeletal carbon atoms, mention may be made of, for example, phenyl, biphenyl, naphthyl, phenanthrenyl and anthracenyl.

$X^1$ and $X^2$

In the general formulae (IIa) and (IIb) and analogously in the general formulae (Xa) and (Xb), $X^1$ and $X^2$ can be, for example, hydrogen, halogen, pseudohalogen, straight-chain or branched $C_1$-$C_{30}$-alkyl, $C_6$-$C_{24}$ aryl, $C_1$-$C_{20}$-alkoxy, $C_6$-$C_{24}$-aryloxy, $C_3$-$C_{20}$-alkyldiketonate, $C_6$-$C_{24}$-aryldiketonate, $C_1$-$C_{20}$-carboxylate, $C_1$-$C_{20}$-alkylsulphonate, $C_6$-$C_{24}$-arylsulphonate, $C_1$-$C_{20}$ alkylthiol, $C_6$-$C_{24}$-arylthiol, $C_1$-$C_{20}$-alkylsulphonyl or $C_1$-$C_{20}$-alkylsulphinyl radicals.

The abovementioned radicals $X^1$ and $X^2$ can also be substituted by one or more further radicals, for example by halogen, preferably fluorine, $C_1$-$C_{10}$-alkyl, $C_1$-$C_{10}$-alkoxy or $C_6$-$C_{24}$-aryl, where these radicals may in turn also be substituted by one or more substituents selected from the group consisting of halogen, preferably fluorine, $C_1$-$C_5$-alkyl, $C_1$-$C_5$-alkoxy and phenyl.

In a preferred embodiment, $X^1$ and $X^2$ are identical or different and are each halogen, in particular fluorine, chlorine, bromine or iodine, benzoate, $C_1$-$C_5$-carboxylate, $C_1$-$C_5$-alkyl, phenoxy, $C_1$-$C_5$-alkoxy, $C_1$-$C_5$-alkylthiol, $C_6$-$C_{24}$-aryl or $C_1$-$C_5$-alkylsulphonate.

In a particularly preferred embodiment, $X^1$ and $X^2$ are identical and are each chlorine, $CF_3COO$, $CH_3COO$, $CFH_2COO$, $(CH_3)_3CO$, $(CF_3)_2(CH_3)CO$, $(CF_3)(CH_3)_2CO$, PhO (phenoxy), MeO (methoxy), EtO (ethoxy), tosylate (p-$CH_3$—$C_6H_4$—$SO_3$), mesylate (2,4,6-trimethylphenyl) or $CF_3SO_3$(trifluoromethanesulphonate).

Ligands $L^1$ and $L^2$

In the general formulae (IIa) and (IIb) and analogously in the general formulae (Xa) and (Xb), $L^1$ and $L^2$ are identical or different ligands, preferably uncharged electron donors.

The two ligands $L^1$ and $L^2$ can, for example, each be, independently of one another, a phosphine, sulphonated phosphine, phosphate, phosphinite, phosphonite, arsine, stibine, ether, amine, amide, sulphoxide, carboxyl, nitrosyl, pyridine, thioether or imidazolidine ("Im") ligand.

Preference is given to the two ligands $L^1$ and $L^2$ each being, independently of one another, a phosphine ligand of the formula $P(L^3)_3$, where the radicals $L^3$ are identical or different and are each alkyl, preferably $C_1$-$C_{10}$-alkyl, particularly preferably $C_1$-$C_5$-alkyl, cycloalkyl, preferably $C_3$-$C_{20}$-cycloalkyl, particularly preferably $C_3$-$C_8$-cycloalkyl, very particularly preferably cyclopentyl, cyclohexyl and neopentyl, aryl, preferably $C_6$-$C_{24}$-aryl, particularly preferably phenyl or tolyl, a sulphonated phosphine ligand of the formula $P(L^4)_3$, where $L^4$ is a monosulphonated or multiply sulphonated ligand $L^3$, a $C_6$-$C_{24}$-aryl phosphinite or $C_1$-$C_{10}$-alkyl phosphinite ligand, a $C_6$-$C_{24}$-aryl phosphonite or $C_1$-$C_{10}$-alkyl phosphonite ligand, a $C_6$-$C_{24}$-aryl phosphite or $C_1$-$C_{10}$-alkyl phosphite ligand, a $C_6$-$C_{74}$-arylarsine or $C_1$-$C_{10}$-alkylarsine ligand, a $C_6$-$C_{24}$-arylamine or $C_1$-$C_{10}$-alkylamine ligand, a pyridine ligand, a $C_6$-$C_{24}$-aryl sulphoxide or $C_1$-$C_{10}$-alkyl sulphoxide ligand, a $C_6$-$C_{24}$-aryl ether or $C_1$-$C_{10}$-alkyl ether ligand or a $C_6$-$C_{24}$-arylamide or $C_1$-$C_{10}$-alkylamide ligand, each of which may be monosubstituted or polysubstituted, for example by a phenyl group, where the substituents may in turn also be substituted by one or more halogen, $C_1$-$C_5$-alkyl or $C_1$-$C_5$ alkoxy radicals.

The term "phosphine" includes, for example, $PPh_3$, $P(o\text{-}Tol)_3$, $P(o\text{-}Tol)_3$, $PPh(CH_3)_2$, $P(CF_3)_3$, $P(p\text{-}FC_6H_4)_3$, $P(p\text{-}CF_3C_6H_4)_3$, $P(C_6H_4\text{—}SO_3Na)_3$, $P(CH_2C_6H_4\text{—}SO_3Na)_3$, $P(\text{isopropyl})_3$, $P(CHCH_3(CH_2CH_3))_3$, $P(\text{cyclopentyl})_3$, $P(\text{cyclohexyl})_3$, $P(\text{neopentyl})_3$ and $P(\text{neophenyl})_3$.

The term "phosphinite" includes, for example, triphenyl phosphinite, tricyclohexyl phosphinite, triisopropyl phosphinite and methyl diphenylphosphinite The term "phosphite" includes, for example, triphenyl phosphite, tricyclohexyl phosphite, tri-tert-butyl phosphite, triisopropyl phosphite and methyl diphenyl phosphite.

The term "stibine" includes, for example, triphenylstibine, tricyclohexylstibine and trimethylstibene.

The term "sulphonate" includes, for example, trifluoromethanesulphonate, tosylate and mesylate.

The term "sulphoxide" includes, for example, $CH_3S(\!=\!O)CH_3$ and $(C_6H_5)_2SO$.

The term "thioether" includes, for example, $CH_3SCH_3$, $C_6H_5SCH_3$, $CH_3OCH_2CH_2SCH_3$ and tetrahydrothiophene.

For the purposes of the present patent application, the term "pyridine" serves as a collective term to include all nitrogen-containing ligands mentioned by Grubbs in WO-A-03/011455. Examples are: pyridine, picolines (α-, β- and γ-picoline), lutidines (2,3-, 2,4-, 2,5-, 2,6-, 3,4- and 3,5-lutidine), collidine (2,4,6-trimethylpyridine), trifluoromethylpyridine, phenylpyridine, 4-(dimethylamino)pyridine, chloropyridines (2-, 3- and 4-chloropyridine), bromopyridines (2-, 3- and 4-bromopyridine), nitropyridines (2-, 3- and 4-nitropyridine), quinoline, pyrimidine, pyrrole, imidazole and phenylimidazole.

The imidazolidine radical (Im) usually has a structure of the general formula (XIa) or (XIb),

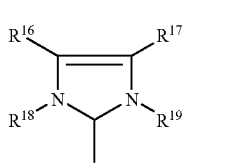
(XIa)

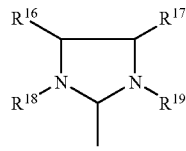
(XIb)

where
$R^{16}$, $R^{17}$, $R^{18}$, $R^{19}$ are identical or different and are hydrogen, straight-chain or branched $C_1$-$C_{30}$-alkyl, $C_3$-$C_{20}$-cycloalkyl, $C_2$-$C_{20}$-alkenyl, $C_2$-$C_{20}$-alkynyl, $C_6$-$C_{24}$-aryl, $C_1$-$C_{20}$-carboxylate, $C_1$-$C_{20}$-alkoxy, $C_2$-$C_{20}$-alkenyloxy, $C_2$-$C_{20}$-alkynyloxy, $C_6$-$C_{20}$-aryloxy, $C_2$-$C_{20}$-alkoxycarbonyl, $C_1$-$C_{20}$-alkylthio, $C_6$-$C_{20}$-arylthio, $C_1$-$C_{20}$-alkylsulphonyl, $C_1$-$C_{20}$-alkylsulphonate, $C_6$-$C_{20}$-arylsulphonate or $C_1$-$C_{20}$-alkylsulphinyl.

If appropriate, one or more of the radicals $R^{16}$, $R^{17}$, $R^{18}$, $R^{19}$ may, independently of one another, be substituted by one or more substituents, preferably straight-chain or branched $C_1$-$C_{10}$-alkyl, $C_3$-$C_8$-cycloalkyl, $C_1$-$C_{10}$-alkoxy or $C_6$-$C_{24}$-aryl, where these abovementioned substituents may in turn be substituted by one or more radicals, preferably radicals selected from the group consisting of halogen, in particular chlorine or bromine, $C_1$-$C_5$-alkyl, $C_1$-$C_5$-alkoxy and phenyl.

Merely in the interests of clarity, it may be pointed out that the structures of the imidazolidine radical depicted in the general formulae (XIa) and (XIb) are equivalent to the structures (XIa') and (XIb') which are frequently also found in the literature for this imidazolidine radical (Im) and emphasize the carbene character of the imidazolidine radical. This applies analogously to the associated preferred structures (XIIa)-(XIIf) shown below.

(XIa')

(XIb')

In a preferred embodiment of the catalysts of the general formulae (IIa) and (IIb), $R^{16}$ and $R^{17}$ are each, independently of one another, hydrogen, $C_6$-$C_{24}$-aryl, particularly preferably phenyl, straight-chain or branched $C_1$-$C_{10}$-alkyl, particularly preferably propyl or butyl, or together with the carbon atoms to which they are bound form a cycloalkyl or aryl radical, where all the abovementioned radicals may in turn be substituted by one or more further radicals selected from the group consisting of straight-chain or branched $C_1$-$C_{10}$-alkyl, $C_1$-$C_{10}$-alkoxy, $C_6$-$C_{24}$-aryl and functional groups selected from the group consisting of hydroxy, thiol, thioether, ketone, aldehyde, ester, ether, amine, imine, amide, nitro, carboxylic acid, disulphide, carbonate, isocyanate, carbodiimide, carboalkoxy, carbamate and halogen.

In a particularly preferred embodiment, the catalysts of the general formulae (IIa) and (IIb) have one or two imidazolidine radicals (Im) as ligands $L^1$ and $L^2$, in which the radicals $R^{18}$ and $R^{19}$ are identical or different and are each straight-chain or branched $C_1$-$C_{10}$-alkyl, particularly preferably i-propyl or neopentyl, $C_3$-$C_{10}$-cycloalkyl, preferably adamantyl, $C_6$-$C_{24}$-aryl, particularly preferably phenyl, $C_1$-$C_{10}$-alkylsulphonate, particularly preferably methane sulphonate, $C_6$-$C_{10}$-arylsulphonate, particularly preferably p-toluene sulphonate.

The abovementioned radicals as meanings of $R^{18}$ and $R^{19}$ may optionally be substituted by one or more further radicals selected from the group consisting of straight-chain or branched $C_1$-$C_5$-alkyl, in particular methyl, $C_1$-$C_5$-alkoxy, aryl and a functional group selected from the group consisting of hydroxy, thiol, thioether, ketone, aldehyde, ester, ether, amine, imine, amide, nitro, carboxylic acid, disulphide, carbonate, isocyanate, carbodiimide, carboalkoxy, carbamate and halogen.

In particular, the radicals $R^{18}$ and $R^{19}$ can be identical or different and are each i-propyl, neopentyl, adamantyl, mesityl or 2,6-diisopropylphenyl.

Very particularly preferred imidazolidine radicals (Im) have the structures (XIIa)-(XIIf) below, where Mes is in each case a 2,4,6-trimethylphenyl radical or alternatively in all cases a 2,6-diisopropylphenyl radical, Ph is a phenyl and Bu a butyl radical.

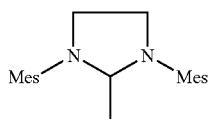
(XIIa)

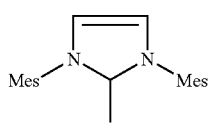
(XIIb)

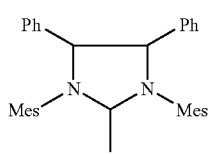
(XIIc)

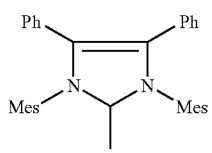
(XIId)

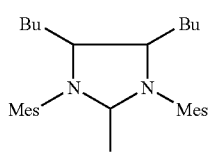
(XIIe)

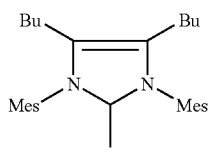
(XIIf)

Preference is likewise given to one or both ligands $L^1$ and $L^2$ in the general formulae (IIa) and (IIb) and analogously in the general formulae (Xa) and (Xb) being identical or different trialkylphosphine ligands in which at least one of the alkyl groups is a secondary alkyl group or a cycloalkyl group, preferably isopropyl, isobutyl, sec-butyl, neopentyl, cyclopentyl or cyclohexyl.

In the general formulae (IIa) and (IIb) and analogously in the general formulae (Xa) and (Xb), particular preference is given to one or both ligands $L^1$ and $L^2$ being a trialkylphosphine ligand in which at least one of the alkyl groups is a secondary alkyl group or a cycloalkyl group, preferably isopropyl, isobutyl, sec-butyl, neopentyl, cyclopentyl or cyclohexyl.

Preference is given to catalysts of the general formulae (IIa) or (IIb) having a general structural unit (I) in which
M is ruthenium,
$X^1$ and $X^2$ are both halogen,
n is 0, 1 or 2 in the general formula (IIa) or
n' is 1 in the general formula (IIb),
$L^1$ and $L^2$ have the general or preferred meanings mentioned for the general formulae (IIa) and (IIb),
$R^1$-$R^8$ have the general or preferred meanings mentioned for the general formulae (IIa) and (IIb),
m is either 0 or 1, and, when m=1,
A is oxygen, sulphur, sulphur, $C(C_1$-$C_{10}$-alkyl$)_2$, —$C(C_1$-$C_{10}$-alkyl$)_2$-$C(C_1$-$C_{10}$-alkyl$)_2$-, —$C(C_1$-$C_{10}$-alkyl)=$C(C_1$-$C_{10}$-alkyl)- or —$N(C_1$-$C_{10}$-alkyl).

Very particular preference is given to catalysts of the formulae (IIa) and (IIb) having a general structural unit (I) in which
M is ruthenium,
$X^1$ and $X^2$ are both chlorine,
n is 0, 1 or 2 in the general formula (IIa) or
n' is 1 in the general formula alb),
$L^1$ is an imidazolidine radical having one of the formulae (XIIa) to (XIIf),
$L^2$ is a sulphonated phosphine, phosphate, phosphinite, phosphorite, arsine, stibine, ether, amine, amide, sulphoxide, carboxyl, nitrosyl, pyridine radical, an imidazolidine radical having one of the formulae (XIIa) to (XIIf) or a phosphine ligand, in particular $PPh_3$, $P(p$-$Tol)_3$, $P(o$-$Tol)_3$, $PPh(CH_3)_2$, $P(CF_3)_3$, $P(p$-$FC_6H_4)_3$, $P(p$-$CF_3C_6H_4)_3$, $P(C_6H_4$—$SO_3Na)_3$, $P(CH_2C_6H_4$—$SO_3Na)_3$, $P(iso$-$propyl)_3$, $P(CHCH_3(CH_2CH_3))_3$, $P(cyclopentyl)_3$, $P(cyclohexyl)_3$, $P(neopentyl)_3$ or $P(neophenyl)_3$,
$R^1$-$R^8$ have the general or preferred meanings mentioned for the general formulae (IIa) and (IIb),
m is either 0 or 1,
and, when m=1,
A is oxygen, sulphur, $C(C_1$-$C_{10}$-alkyl$)_2$, —$C(C_1$-$C_{10}$-alkyl$)_2$-$C(C_1$-$C_{10}$-alkyl$)_2$-, —$C(C_1$-$C_{10}$-alkyl)=$C(C_1$-$C_{10}$-alkyl)- or —$N(C_1$-$C_{10}$-alkyl).

When the radical $R^8$ is bridged to another ligand of the catalyst of the invention, the catalysts of the general formulae (IIa) and (IIb) have, for example, the structures of the general formulae (XIIIa) and (XIIIb)

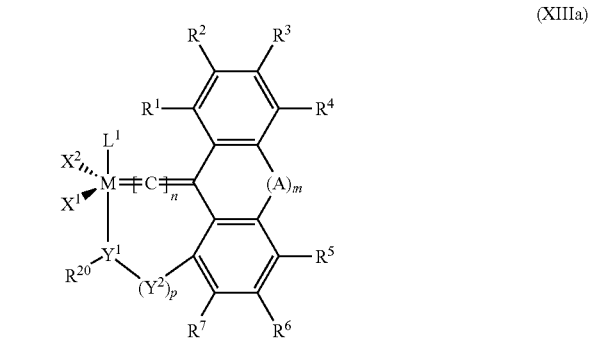
(XIIIa)

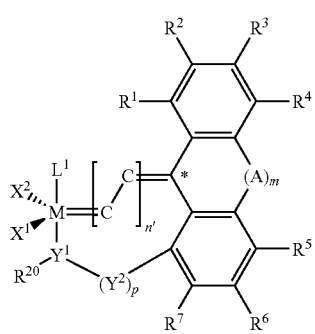

(XIIIb)

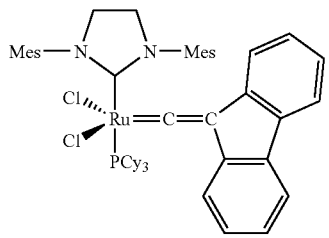

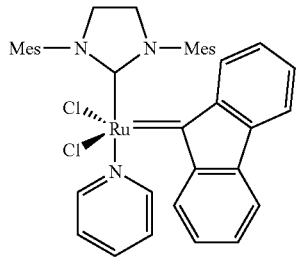

where

Y$^1$ is oxygen, sulphur, an N—R$^{21}$ radical or a P—R$^{21}$ radical, where R$^{21}$ is as defined below, R$^{20}$ and R$^{21}$ are identical or different and are each an alkyl, cycloalkyl, alkenyl, alkynyl, aryl, alkoxy, alkenyloxy, alkynyloxy, aryloxy, alkoxycarbonyl, alkylamino, alkylthio, arylthio, alkylsulphonyl or alkylsulphinyl radical which may all optionally be substituted by one or more alkyl, halogen, alkoxy, aryl or heteroaryl radicals, p is 0 or 1 and Y$^2$ is, when p=1, —(CH$_2$)$_r$— where r=1, 2 or 3, —C(=O)—CH$_2$—, —C(=O)—, —N=CH—, —N(H)—C(=O)— or alternatively the overall structural unit "—Y(R$^{20}$)—(Y$^2$)$_p$—" is (—N(R$^{20}$)=CH—CH$_2$—), (—N(R$^{20}$,R$^{21}$)=CH—CH$_2$—) and M, X$^1$, X$^2$, L$^1$, R$^1$-R$^8$, A, m and n have the same meanings as in the general formulae (IIa) and (IIb).

As examples of the catalysts of the invention, mention may be made of the following structures:

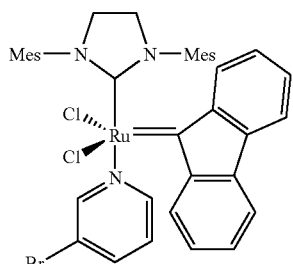

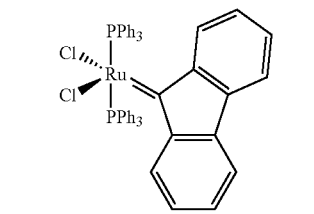 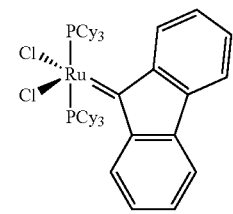

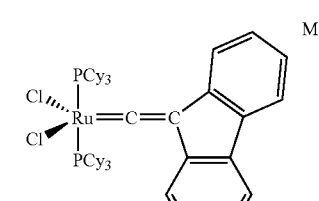 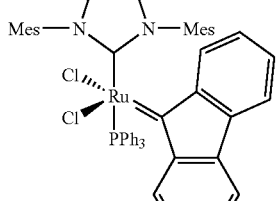

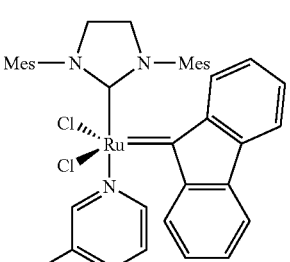

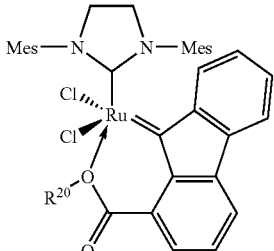

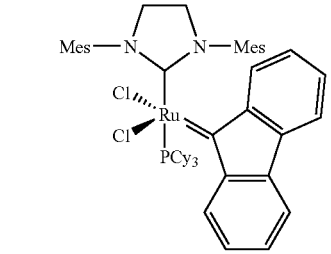

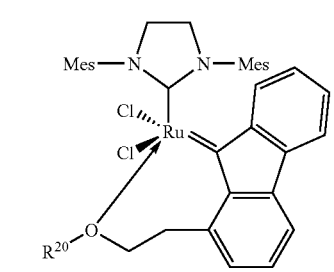

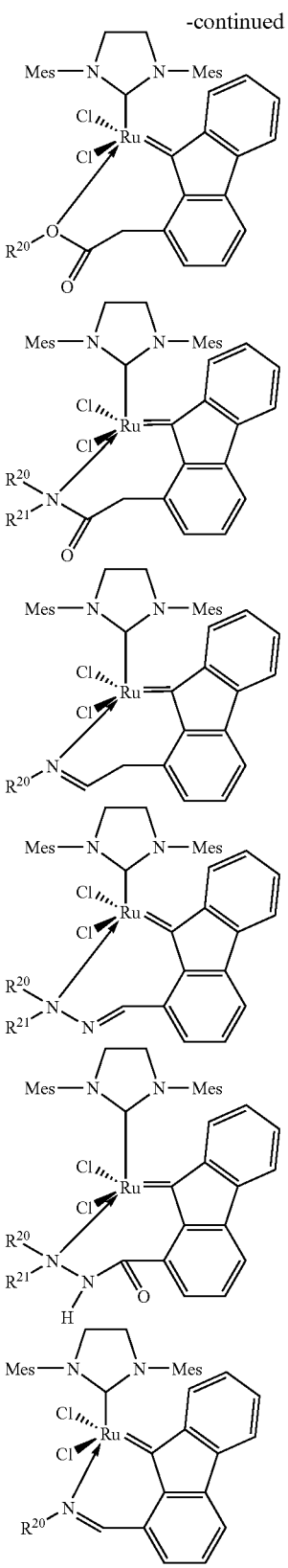

Preparation of the Catalysts of the Invention:

The synthesis of such ruthenium- or osmium-carbene complex catalysts can be carried out by reacting suitable catalyst precursor complexes with suitable diazo compounds, the synthesis is carried out in a specific temperature range and the molar ratio of the starting materials is at the same time in a specific range.

The invention accordingly provides a process for preparing ruthenium- or osmium-carbene catalysts having a structural element of the general formula (I) by reacting a catalyst precursor compound with a compound of the general formula (XVI)

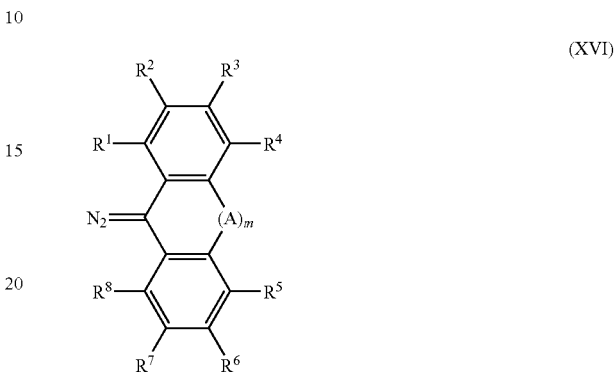

where $R^1$-$R^8$, m and A have the meanings mentioned for the general formula (I), characterized in that the reaction is carried out (i) at a temperature in the range from −20° C. to 100° C., preferably in the range from +10° C. to +80° C., particularly preferably in the range from +30 to +50° C. and (ii) at a molar ratio of the catalyst precursor compound to the compound of the general formula (XVI) of from 1:0.5 to 1:5, preferably from 1:1.5 to 1:2.5, particularly preferably 1:2.

The compounds of the general formula (XVI) are 9-diazofluorene or various derivatives thereof, depending on the meanings of the radicals $R^1$-$R^8$ and A. Various derivatives of 9-diazofluorene can be used in the preparative process of the invention. A wide variety of fluorenylidene derivatives can be obtained this way.

The catalyst precursor compounds are ruthenium or osmium complex catalysts which do not yet contain a ligand comprising the general structural element (I).

In this reaction, a ligand leaves the catalyst precursor compound and a carbene ligand containing the general structural element (I) is taken up.

Saturated, unsaturated and aromatic hydrocarbons, ethers and halogenated solvents are suitable for carrying out the reaction. Preference is given to chlorinated solvents such as dichloromethane, 1,2-dichloroethane or chlorobenzene.

The catalyst precursor compound is usually initially charged in the form of the ruthenium or osmium precursor in a preferably dried solvent. The concentration of the ruthenium or osmium precursor in the solvent is usually in the range from 15 to 25% by weight, preferably in the range from 15 to 20% by weight. The solution can subsequently be heated. It has been found to be particularly useful to heat the solution to a temperature in the range from 30 to 50° C. The compound of the general formula (XVI), which is usually dissolved in a dried, preferably water-free solvent, is then added. The concentration of the compound of the general formula (XVI) in the solvent is preferably in the range from 5 to 15% by weight, preferably about 10%. To complete the reaction, the mixture is allowed to react further for from 0.5 h to 1.5 h, during which time the temperature is particularly preferably in the same range as mentioned above, i.e. from 30 to 50° C. The solvent is subsequently removed and the residue is purified by extraction, for example with a mixture of hexane with an aromatic solvent.

The catalyst of the invention is usually not obtained in pure form but as an equimolar, due to the stochiometry of the reaction, mixture with the reaction product of the compound of the general formula (XVI) with the leaving ligand of the catalyst precursor compound used in the reaction. The leaving ligand is preferably a phosphine ligand. This reaction product can be removed in order to obtain the pure catalyst of the invention. However, it is not necessary to use the pure catalyst of the invention for the catalysis of metathesis reactions, but instead it is also possible to use the mixture of this catalyst according to the invention with the abovementioned reaction product.

The above-described process is illustrated below:

In the case of the catalysts of the general formulae (IIa) and (IIb), a catalyst precursor compound of the general formula (XVII),

(XVII)

where

M, $X^1$, $X^2$, $L^1$ and $L^2$ have the same general and preferred meanings as in the general formulae (IIa) and (IIb) and AbL is a "leaving ligand" and can have the same meanings as $L^1$ and $L^2$ in the general formulae (IIa) and (IIb), preferably a phosphine ligand having one of the meanings mentioned for the general formulae (IIa) and (IIb), is reacted with a compound of the general formula (XVI) at a temperature in the range from −20° C. to 100° C., preferably in the range from +10° C. to +80° C., particularly preferably in the range from +30 to +50° C., and a molar ratio of the catalyst precursor compound of the general formula (XVII) to the compound of the general formula (XVI) of from 1:0.5 to 1:5, preferably from 1:1.5 to 1:2.5, particularly preferably 1:2.

The preparation of a catalyst coming under the general formula (II) is described by way of example below. The reaction gives the desired fluorenylidene carbene complex catalyst in a mixture with fluorenylidenetriphenylphosphazine.

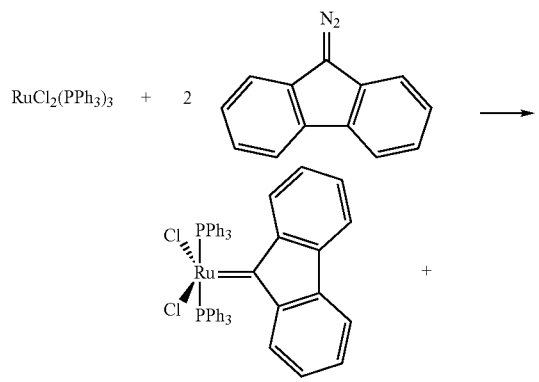

-continued

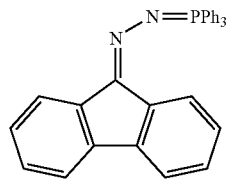

The catalyst of the invention RuCl₂(fluorenylidene)(PPh₃)₂ shown in the above scheme differs from those known from the prior art by being significantly more stable than RuCl₂(benzylidene)(PPh₃)₂. RuCl₂(benzylidene)(PPh₃)₂ is stable in the solid state but decomposes in solution even at −60° C. (J. Am. Chem. Soc. 1996, 118, 100). To improve the stability in solution, RuCl₂(benzylidene)(PPh₃)₂ has to be reacted with PCy₃ to form RuCl₂(benzylidene)(PCy₃)₂. This is not necessary in the case of the corresponding RuCl₂(fluorenylidene)(PPh₃)₂. This is an economic advantage.

To introduce one or two Im ligands ("Im" as defined above for the formulae (XIa) and (XIb) and also (XIIIa-f)), the following procedure has been found to be useful:

In the first step, the above-described process for preparing a catalyst according to the invention is carried out, with the ligands $L^1$ and $L^2$ all having the meanings mentioned for the general formulae (IIa) and (IIb) apart from that of the Im ligand. In the second step, one or both ligands $L^1$ and $L^2$ in this catalyst according to the invention which already contains the general structural element (I) is/are replaced by an Im ligand.

This procedure is particularly preferred for the preparation of a catalyst according to the invention of the formula RuCl₂ ("fluorenylidene")(PPh₃)(Im), where "fluorenylidene" is used as a representative of the ligand containing the general structural element (I) in the complex catalyst: firstly, RuCl₂ ("fluorenylidene")(PPh₃)₂ is prepared from RuCl₂(PPh₃)₃ by ligand exchange and, in the second step, one of the two triphenylphosphine ligands is replaced by a saturated or unsaturated Im ligand.

To introduce the Im ligand or ligands, it is possible to use free carbenes as obtained by the method of Arduengo (J. Am. Chem. Soc. 1995, 117, 11027). As an alternative, salts of the carbenes with strong acids such as hydrochloric acid or tetrafluoroboric acid or carbene adducts of chloroform, t-butanol, chloral, etc., are used as starting materials. When carbene salts or carbene adducts are used, the "free" carbene is produced in situ by means of strong bases, as described in U.S. Pat. No. 6,613,910.

However, preference is given to using the free carbenes prepared and isolated by the process described by Arduengo in J. Am. Chem. Soc. 1995, 117, 11027. This process described by Arduengo has the advantage that both saturated and unsaturated carbenes can be obtained in this way, since according to U.S. Pat. No. 6,613,910 the carbene adducts of unsaturated carbenes cannot be obtained: "It is relevant to note that only 4,5-dihydroimidazolium salts form imidazolidenes—the aromatic imidazolium salts (i.e., the unsaturated analogues never form these adducts under any conditions" (column 19, line 65 to column 20, line 1).

The second step of the two-stage procedure described, in which the Im ligand is introduced, is illustrated by way of example below:

The preparation of compounds of the general formula (IIa) in which $L^1$ and/or $L^2$ is/are an Im ligand is thus carried out by reacting compounds of the general formula (IIa')

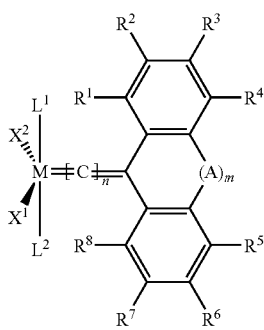

(IIa')

where $X^1$, $X^2$, $L^2$, n, m, A and $R^1$-$R^8$ have the same meanings as in the general formula (IIa), $L^1$ and $L^2$ are identical or different and are each a phosphine ligand, preferably $PPh_3$, $P(p\text{-Tol})_3$, $P(o\text{-Tol})_3$, $PPh(CH_3)_2$, $P(CF_3)_3$, $P(p\text{-FC}_6H_4)_3$, $P(p\text{-CF}_3C_6H_4)_3$, $P(C_6H_4\text{—}SO_3Na)_3$, $P(CH_2C_6H_4\text{—}SO_3Na)_3$, $P(\text{isopropyl})_3$, $P(CHCH_3(CH_2CH_3))_3$, $P(\text{cyclopentyl})_3$, $P(\text{cyclohexyl})_3$, $P(\text{neopentyl})_3$ or $P(\text{neophenyl})_3$ and with a compound of the general formula (XVIIIa) or (XVIIIb)

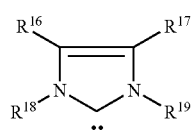

(XVIIIa)

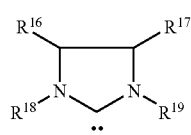

(XVIIIb)

where $R^{16}$ to $R^{19}$ have the meanings mentioned for the general formulae (XIa) and (XIb).

In this reaction, the ligand $L^1$ and/or the ligand $L^2$ in the formula (IIa') is/are replaced by a ligand of the formula (XVIIIa) or (XVIIIb).

This reaction is illustrated below for a particularly preferred example in which a $P(Ph)_3$ ligand is replaced by an Im ligand.

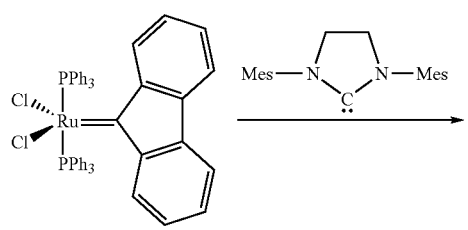

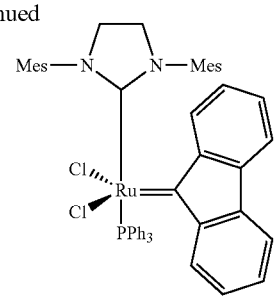

This reaction is usually carried out at a temperature in the range from −20° C. to 80° C., preferably in the range from 0° C. to 50° C.

If the molar ratio of the compound of the general formula (IIa') to the compound of the formula (XVIIIa) or (XVIIIb) is in the range from 1:0.5 to 1:1.5, preferably 1:1, one ligand $L^1$ or $L^2$ is usually replaced by an Im ligand.

If the molar ratio of the compound of the general formula (IIa') to the compound of the formula (XVIIIa) or (XVIIIb) is in the range from 1:2 to 1:5, preferably from 1:2 to 1:3, two Im ligands are usually introduced.

The reaction is carried out in saturated, unsaturated or aromatic hydrocarbons or in ethers or mixtures thereof. Preference is given to ethers, in particular diethyl ether, since the reaction product is insoluble therein.

Starting from the inventive catalysts of the general formulae (IIa) and (IIb) which are obtained by the two-stage process and still contain a phosphine ligand ($L^2$) in addition to an Im ligand ($L^1$), it is possible to replace the phosphine ligand ($L^2$) by another ligand $L^2$ which is a nitrogen-containing, preferably aromatic heterocycle, in particular pyridine or a derivative thereof having the meanings indicated on pages 10 and 11, in a third step.

In these reactions, only a nitrogen-containing, preferably aromatic heterocycle is always introduced into the catalyst according to the invention of the general formula (IIa) or (IIb) which already comprises the structural element (I).

The phosphine/pyridine exchange referred to above is carried out by methods analogous to the reactions described by Grubbs in WO-A-03/011455.

Furthermore, many processes for synthesizing transition metal complex catalysts having carbene ligands and in principle introducing carbene ligands into transition metal complex catalysts are known from the literature. These include, for example, WO-A-96/04289, WO-A-97/06185, WO-A-00/71554, US 2002/0107138 A1, WO-A-2004/035596, WO-A-03/011455. Such syntheses are also known from US-A-2003/0100776, WO-A-2003/011455 and WO-A-2003/087167. A person skilled in the art will be able to synthesize the catalysts of the invention on the basis of such literature methods.

A Method of Applying the Catalysts of the Invention in Metathesis Reactions

The invention further provides for a process of applying the catalysts of the invention in metathesis reactions.

The metathesis reactions are the metathesis reactions described in WO-A-97/06185 and Platinum Metals Rev., 2005, 49, (3), 123-137, in particular ring-closing metatheses (RCM), cross metatheses (CM), ring-opening metatheses (ROM), ring-opening metathesis polymerizations (ROMP), cyclic diene metathesis polymerizations (ADMET), self-metatheses, reactions of alkenes with alkynes (enyne reactions), polymerization of alkynes and olefinization of carbonyls.

The catalysts of the invention are suitable, for example, for the ring-closing metathesis of diethyl diallylmalonate, diallylmalononitrile, under an inert gas atmosphere or under aerobic conditions.

The catalyst systems of the invention are preferably used for the metathesis of nitrile rubber. These are processes for reducing the molecular weight of the nitrile rubber by bringing the nitrile rubber into contact with the catalyst according to the invention. This reaction is a cross metathesis.

All abovementioned catalysts of type (B) can either be used as such in the reaction mixture of the NBR metathesis or can be applied to and immobilized on a solid support. Suitable solid phases or supports are materials which, firstly, are inert towards the reaction mixture of the metathesis and, secondly, do not adversely affect the activity of the catalyst. Immobilization of the catalyst can be achieved using, for example, metals, glass, polymers, ceramic, organic polymer spheres or inorganic sol-gels, carbon black, silica, silicates, calcium carbonate and barium sulphate.

The amount of metathesis catalyst per amount of nitrile rubber used depends on the nature and catalyst activity of the specific catalyst. The amount of catalyst used is usually from 1 to 1000 ppm of noble metal, preferably from 2 to 500 ppm, in particular from 5 to 250 ppm, based on the nitrile rubber used.

The NBR metathesis can be carried out in the absence or in the presence of a coolefin. This coolefin is preferably a straight-chain or branched $C_2$-$C_{16}$-olefin. Suitable coolefins are, for example, ethylene, propylene, isobutene, styrene, 1-hexene or 1-octene. Preference is given to using 1-hexene or 1-octene. If the coolefin is liquid (as in the case of, for example, 1-hexene), the amount of coolefin is preferably in the range 0.2-20% by weight based on the nitrile rubber used. If the coolefin is a gas, as in the case of, for example, ethylene, the amount of coolefin is chosen so that a pressure in the range $1 \times 10^5$ Pa-$1 \times 10^7$ Pa, preferably a pressure in the range from $5.2 \times 10^5$ Pa to $4 \times 10^6$ Pa, is established in the reaction vessel at room temperature.

The metathesis reaction can be carried out in a suitable solvent which does not deactivate the catalyst used and also does not adversely affect the reaction in any other way. Preferred solvents include, but are not restricted to, dichloromethane, benzene, toluene, methyl ethyl ketone, acetone, tetrahydrofuran, tetrahydropyran, dioxane and cyclohexane. The particularly preferred solvent is chlorobenzene. In some cases, where the coolefin can itself function as solvent, e.g. in the case of 1-hexene, the addition of a further, additional solvent can also be omitted.

The concentration of the nitrile rubber used in the reaction mixture of the metathesis is not critical, but it naturally has to be ensured that the reaction is not adversely affected by an excessively high viscosity of the reaction mixture and the mixing problems associated therewith. The concentration of the NBR in the reaction mixture is preferably in the range from 1 to 25% by weight, particularly preferably in the range from 5 to 20% by weight, based on the total reaction mixture.

The metathesis degradation is usually carried out at a temperature in the range from 10° C. to 150° C., preferably at a temperature in the range from 20 to 100° C.

The reaction time depends on a number of factors, for example on the type of NBR, the type of catalyst, the catalyst concentration used and the reaction temperature. The reaction is typically complete within three hours under normal conditions. The progress of the metathesis can be monitored by standard analytical methods, e.g. by GPC measurements or by determination of the viscosity.

As nitrile rubbers ("NBR"), it is possible to use copolymers or terpolymers which contain repeating units of at least one conjugated diene, at least one α,β-unsaturated nitrile and, if appropriate, one or more further copolymerizable monomers in the metathesis reaction.

The conjugated diene can be of any nature. Preference is given to using ($C_4$-$C_6$) conjugated dienes. Particular preference is given to 1,3-butadiene, isoprene, 2,3-dimethylbutadiene, piperylene or mixtures thereof. Particular preference is given to 1,3-butadiene and isoprene or mixtures thereof. Very particular preference is given to 1,3-butadiene.

As α,β-unsaturated nitrile, it is possible to use any known α,β-unsaturated nitrile, preferably a ($C_3$-$C_5$) α,β-unsaturated nitrile such as acrylonitrile, methacrylonitrile, ethacrylonitrile or a mixture thereof. Particular preference is given to acrylonitrile.

A particularly preferred nitrile rubber is therefore a copolymer of acrylonitrile and 1,3-butadiene.

Apart from the conjugated diene and the α,β-unsaturated nitrile, one or more further copolymerizable monomers known to those skilled in the art, e.g. α,β-unsaturated monocarboxylic or dicarboxylic acids, their esters or amides, can additionally be used. As α,β-unsaturated monocarboxylic or dicarboxylic acids, preference is given to fumaric acid, maleic acid, acrylic acid and methacrylic acid. As esters of α,β-unsaturated carboxylic acids, preference is given to using their alkyl esters and alkoxyalkyl esters. Particularly preferred alkyl esters of α,β-unsaturated carboxylic acids are methyl acrylate, ethyl acrylate, butyl acrulate, butyl methacrylate, 2-ethylhexyl acrylate, 2-ethylhexyl methacrylate and octyl acrylate. Particularly preferred alkoxyalkyl esters of α,β-unsaturated carboxylic acids are methoxyethyl (meth)acrylate, ethoxyethyl (meth)acrylate and methoxyethyl (meth)acrylate. It is also possible to use mixtures of alkyl esters such as those mentioned above with alkoxyalkyl esters, e.g. in the form of those mentioned above.

The proportions of conjugated diene and α,β-unsaturated nitrile in the NBR polymers to be used can vary within a wide range. The proportion of the conjugated diene or sum of the conjugated dienes is usually in the range from 40 to 90% by weight, preferably in the range from 60 to 85% by weight, based on the total polymer. The proportion of the α,β-unsaturated nitrile or sum of the α,β-unsaturated nitriles is usually from 10 to 60% by weight, preferably from 15 to 40% by weight, based on the total polymer. The proportions of the monomers in each case add up to 100% by weight. The additional monomers can be present in amounts of from 0 to 40% by weight, preferably from 0.1 to 40% by weight, particularly preferably from 1 to 30% by weight, based on the total polymer. In this case, appropriate proportions of the conjugated diene or dienes and/or of the α,β-unsaturated nitrile or nitriles are replaced by the proportions of the additional monomers, with the proportions of all monomers in each case adding up to 100% by weight.

The preparation of nitrile rubbers by polymerization of the abovementioned monomers is adequately known to those skilled in the art and is comprehensively described in the literature.

Nitrile rubbers which can be used for the purposes of the invention are also, easy available, e.g. as products from the product series of the grades Perbunan® and Krynac® from Lanxess Deutschland GmbH.

The nitrile rubbers used for the metathesis have a Mooney viscosity (ML 1+4 at 100° C.) in the range from 30 to 70, preferably from 30 to 50. This corresponds to a weight average molecular weight $M_w$ in the range 150 000-500 000, preferably in the range 180 000-400 000. Furthermore, the nitrile rubbers used have a polydispersity PDI=$M_w/M_n$, where $M_w$ is the weight average molecular weight and $M_n$ is the number average molecular weight, in the range 2.0-6.0 and preferably in the range 2.0-4.0.

The determination of the Mooney viscosity is carried out in accordance with ASTM standard D 1646.

The nitrile rubbers obtained by the metathesis process of the invention have a Mooney viscosity (ML 1+4 at 100° C.) in the range 5-30, preferably in the range 5-20. This corresponds to a weight average molecular weight $M_w$ in the range 10 000-100 000, preferably in the range 10 000-80 000. Furthermore, the nitrile rubbers obtained have a polydispersity PDI=$M_w/M_n$, where $M_n$ is the number average molecular weight, in the range 1.4-4.0, preferably in the range 1.5-3.0.

Salt Additions in the Metathesis:

In one embodiment, the NBR metathesis can be carried out in the presence of one or more salts having the general formula (XIX)

$$K^{n+}A^{z-} \quad (XIX)$$

where
K is a cation and
A is an anion, and
n is 1, 2 or 3 and
z is 1, 2 or 3.

Suitable cations are based on elements from the Periodic Table (main groups and transition group elements) which can form cations bearing one, two or three positive charges.

Suitable cations are, for example, lithium, sodium, potassium, rubidium, caesium, francium, beryllium, magnesium, calcium, strontium, barium, aluminium, gallium, indium, thallium, germanium, tin, lead, arsenic, antimony, bismuth, scandium, yttrium, titanium, zirconium, hafnium, vanadium, niobium, tantalum, chromium, molybdenum, tungsten, manganese, technetium, rhenium, iron, ruthenium, osmium, cobalt, rhodium, iridium, nickel, palladium, platinum, silver, gold, zinc, cadmium, mercury and also all elements of the groups of the rare earths, in particular cereum, praseodymium and neodymium, and also the actinide elements.

Further suitable cations are complex cations based on nitrogen, phosphorous or sulphur. It is possible to use, for example, tetralkyl ammonium, tetraaryl ammonium, hydroxyl ammonium, tetraalkyl phosphonium, tetraaryl phosphonium, sulphonium, anilinium, pyridinium, imidazolonium, guanidinium and hydrazinium cations and also cationic ethylene diamine derivatives.

The alkyl radicals in all the abovementioned complex cations can be identical or different and are usually each a straight-chain or branched $C_1$-$C_{30}$-alkyl radical, preferably a $C_1$-$C_{20}$-alkyl radical, particularly preferably a $C_1$-$C_{18}$-alkyl radical. These alkyl radicals can also be substituted by aryl radicals. $C_1$-$C_{18}$-alkyl encompasses, for example, methyl, ethyl, n-propyl, isopropyl, n-butyl, sec-butyl, tert-butyl, n-pentyl, 1-methylbutyl, 2-methylbutyl, 3-methylbutyl, neopentyl, 1-ethylpropyl, cyclohexyl, cyclopentyl, n-hexyl, 1,1-dimethylpropyl, 1,2-dimethylpropyl, 1,2-dimethylpropyl, 1-methylpentyl, 2-methylpentyl, 3-methylpentyl, 4-methylpentyl, 1,1-dimethylbutyl, 1,2-dimethylbutyl, 1,3-dimethylbutyl, 2,2-dimethylbutyl, 2,3-dimethylbutyl, 3,3-dimethylbutyl, 1-ethylbutyl, 2-ethylbutyl, 1,1,2-trimethylpropyl, 1,2,2-trimethylpropyl, 1-ethyl-1-methylpropyl, 1-ethyl-2-methylpropyl, n-heptyl, n-octyl, n-nonyl, n-decyl, n-undecyl, n-dodecyl, n-tridecyl, n-tetradecyl, n-hexadecyl, n-octadecyl and benzyl.

The aryl radicals in all the abovementioned complex cations can likewise be identical or different and are usually each a $C_5$-$C_{24}$-aryl radical, preferably a $C_6$-$C_{14}$-aryl radical, particularly preferably a $C_6$-$C_{10}$-aryl radical. Examples of $C_5$-$C_{24}$-aryl are phenyl, o-, p-, m-tolyl, naphthyl, phenanthrenyl, anthracenyl and fluorenyl.

The sulphonium cations of the type $[R_3S]^+$ have three identical or different radicals which can be aliphatic or aromatic in character. These radicals can be alkyl or aryl radicals having the abovementioned general, preferred and particularly preferred meanings.

Particularly preferred complex cations are benzyldodecyldimethylammonium, didecyldimethylammonium, dimethylanilinium, N-alkyl-N,N-bis(2-hydroxyalkyl)-N-benzylammonium, N,N,N-triethylbenzenemethanaminium, O-methyluronium, S-methylthiuronium, pyridinium, tetrabutylammonium, tetramethyluronium, tetracetylammonium, tetrabutylphosphonium, tetraphenylphosphonium, diphenylguanidinium, di-o-tolyl-guanidinium, butyldiphenylsulphonium, tributylsulphonium.

In the general formula (I), A is a singly, doubly or triply charged anion, preferably from the group consisting of halides, pseudohalides, complex anions, anions of organic acids, aliphatic or aromatic sulphonates, aliphatic or aromatic sulphates, phosphonates, phosphates, thiophosphates, xanthogenates, dithiocarbamates and noncoordinating anions.

Preferred halides are fluoride, chloride, bromide and iodide.

Preferred pseudohalides are, for example, triiodide, azide, cyanide, thiocyanide, thiocyanate and interhalides.

Suitable complex anions are, for example, sulphite, sulphate, dithionite, thiosulphate, carbonate, hydrogencarbonate, perthiocarbonate, nitrite, nitrate, perchlorate, tetrafluoroborate, tetrafluoroaluminate, hexafluorophosphate, hexafluoroarsenate, hexafluoroantimonate and hexachloroantimonate.

Preferred singly, doubly or triply charged anions of organic acids are singly, doubly or triply charged anions of organic carboxylic acids having from 1 to 20 carbon atoms. The organic carboxylic acids can be saturated or monounsaturated or polyunsaturated. Selected examples are formate, acetate, propionate, butyrate, oleate, palmitate, stearate, versatate, acrylate, methacrylate, crotonate, benzoate, naphthalenecarbonate, oxalate, salicylate, terephthalate, fumarate, maleate, itaconate and abietate.

Suitable aliphatic or aromatic sulphonates are anthraquinone-2-sulphonate, benzenesulphonate, benzene-1,3-disulphonate, decane-1-sulphonate, hexadecane-1-sulphonate, hydroquinonemonosulphonate, methyl-4-toluenesulphonate, naphthalene-1-sulphonate, naphthalene-1,5-disulphonate, tosylate and mesylate.

Suitable aliphatic or aromatic sulphates are, for example, dodecylsulphate and alkylbenzenesulphates.

Suitable phosphonates, phosphates and thiophosphates are vinylphosphonate, ethylphosphonate, butylphosphonate, cetylphosphonate, dibutylphosphate, dioctylphosphate, dibutyldithiophosphate, and dioctylthiophosphate.

Suitable aliphatic or aromatic xanthogenates are ethylxanthogenate, butylxanthogenate, phenylxanthogenate, benzylxanthogenate, etc.

Suitable aliphatic or aromatic dithiocarbamates are dimethyldithiocarbamate, diethyldithiocarbamate, dibutyldithiocarbamate and dibenzyldithiocarbamate.

Noncoordinating anions are, for example, tetrakis[pentafluorophenyl]borate, pentakis-[pentafluorophenyl]phosphate, tetrakis[3,5-trifluoromethylphenyl]borate, pentakis[3,5-trifluoromethylphenyl]phosphate and the pentakis[pentafluorophenyl]cyclohexadienyl anion.

Preference is given to using, for example, alkali metal halides such as lithium chloride, bromide or iodide and caesium bromide.

Preference is also given to using, for example, alkaline earth metal chlorides, such as calcium chloride and magnesium chloride.

Amount of Salt: Nitrile Rubber:

In the catalyst system of the invention, the metathesis catalyst and the salt or salts of general formula (I) are used in a weight ratio of salt(s):metathesis catalyst of from 0.01:1 to 10 000:1, preferably from 0.1:1 to 1000:1, particularly preferably from 0.5:1 to 500:1.

The salt or salts can be added in a solvent or else without solvents to the metathesis catalyst or its solution.

As solvent or dispersion medium with which the salt or salts is/are added to the catalyst or its solution, it is possible to use all known solvents. For the salt addition to be effective, it is not absolutely necessary for the salt or salts to have a high solubility in the solvent. Preferred solvents encompass, but are not restricted to, acetone, benzene, chlorobenzene, chloroform, cyclohexane, dichlormethane, dioxane, dimethylformamide, dimethylacetamide, dimethyl sulphone, dimethyl sulphoxide, methyl ethyl ketone, tetrahydrofuran, tetrahydropyran and toluene. The solvent is preferably inert towards the metathesis catalyst.

If the catalysts of the invention are used for the metathesis of nitrile rubber, the amount in which the salt is used per amount of rubber to be degraded is in the range from 0.0001 phr to 50 phr, preferably from 0.001 phr to 35 phr (phr=parts by weight per 100 parts by weight of rubber).

When used for NBR metathesis, too, the salt can be added in a solvent or dispersion medium or else without solvent or dispersion medium to a solution of the metathesis catalyst. As an alternative, the salt can also be added directly to a solution of the nitrile rubber to be degraded, and this is then added to the metathesis catalyst.

Addition of Transition Metal Alkoxides:

Transition metal alkoxides can also be added in the metathesis processes, in particular the metathetic degradation of NBR.

These are compounds of the general formula (XX)

$$M'(OZ')_{m'} \qquad (XX)$$

where

M' is a transition metal of transition group 4, 5 or 6 of the Periodic Table of the Elements, m' is 4, 5 or 6 and the radicals Z' are identical or different and are each a linear, branch, aliphatic, cyclic, heterocyclic or aromatic radical which has 1-32 carbon atoms and may additionally have from 1 to 15 heteroatoms.

Suitable transition metals of transition groups 4. 5. and 6. in the compounds of the general formula (XX) are titanium, zirconium, hafnium, vanadium, niobium, tantalum, chromium, molybdenum and tungsten.

In the compounds of the general formula (XX), the radicals Z' are identical or different and are linear, branched, aliphatic, cyclic, heterocyclic or aromatic radicals which have 1-30 carbon atoms and may additionally have from 1 to 15 heteroatoms, preferably nitrogen or oxygen.

Provided that the radicals Z' have 1-32 carbon atoms and additionally may have from 1 to 15 heteroatoms, preferably nitrogen or oxygen, Z' can be straight-chain or branched $C_1$-$C_{30}$-alkyl, preferably $C_1$-$C_{20}$-alkyl, particularly preferably $C_1$-$C_{12}$-alkyl, $C_3$-$C_{20}$-cycloalkyl, preferably $C_3$-$C_{10}$-cycloalkyl, particularly preferably $C_5$-$C_8$-cycloalkyl, $C_2$-$C_{20}$-alkenyl, preferably $C_2$-$C_{18}$-alkenyl, $C_2$-$C_{20}$-alkynyl, a radical of the general formula , where p is an integer from 1 to 10, the radicals Z" are identical or different and are each hydrogen or methyl, the radicals $Z^1$ located on adjacent carbon atoms are preferably different and $A^2$ is oxygen, sulphur or —NH, a $C_6$-$C_{24}$-aryl radical, preferably a $C_6$-$C_{14}$-aryl radical, or a $C_4$-$C_{23}$-heteroaryl radical having at least one heteroatom, preferably nitrogen or oxygen.

Preference is given to using compounds of the general formula (XX) in which

M' is titanium, zirconium, hafnium, vanadium, niobium, tantalum, chromium, molybdenum or tungsten, m is 4, 5 or 6 and Z' is methyl, ethyl, n-propyl, i-propyl, n-butyl, i-butyl, tert-butyl, n-pentyl, i-pentyl, t-pentyl, dodecyl, oleyl, phenyl or sterically hindered phenyl.

Compounds of the general formula (I) which are particularly preferably used in the process of the invention are tetraethoxytitanate, tetraisopropyloxytitanate, tetra-tert-butyloxytitanate, tetra-tert-butyloxyzirkonate, pentaethoxyniobate and pentaethoxytantalate.

Hydrogenation:

The metathetic degradation in the presence of the catalyst system of the invention can be fired by a hydrogenation of the degraded nitrile rubbers obtained. This can be carried out in a manner known to those skilled in the art.

It is possible to carry out the hydrogenation using homogeneous or heterogeneous hydrogenation catalysts. It is also possible to carry out the hydrogenation in situ, i.e. in the same reaction vessel in which the metathetic degradation has previously also been carried out and without the necessity of isolating the degraded nitrile rubber. The hydrogenation catalyst is simply introduced into the reaction vessel.

The catalysts used are usually based on rhodium, ruthenium or titanium, but it is also possible to use platinum, iridium, palladium, rhenium, ruthenium, osmium, cobalt or copper either as metal or preferably in the form of metal compounds (see, for example, U.S. Pat. No. 3,700,637, DE-A-25 39 132, EP-A-0 134 023, DE-OS-35 41 689, DE-OS-35 40 918, EP-A-0 298 386, DE-OS-35 29 252, DE-OS-34 33 392, U.S. Pat. No. 4,464,515 and U.S. Pat. No. 4,503,196).

Suitable catalysts and solvents for a hydrogenation in a homogeneous phase are described below and are also known from DE-A-25 39 132 and EP-A-0 471 250.

The selective hydrogenation can, for example, be carried out in the presence of a rhodium- or ruthenium-containing catalyst. It is possible to use, for example, a catalyst of the general formula

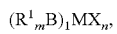

where M is ruthenium or rhodium, the radicals $R^1$ are identical or different and are each a $C_1$-$C_8$ alkyl group, a $C_4$-$C_8$ cycloalkyl group, a $C_6$-$C_{15}$ aryl group or a $C_7$-$C_{15}$-aralkyl group. B is phosphorus, arsenic, sulphur or a sulphoxide group S=O, X is hydrogen or an anion, preferably halogen and particularly preferably chlorine or bromine, l is 2, 3 or 4, m is 2 or 3 and n is 1, 2 or 3, preferably 1 or 3. Preferred catalysts are tris(triphenylphosphine)rhodium(I) chloride, tris(triphenylphosphine)rhodium(III) chloride and tris(dimethyl sulphoxide)rhodium(I) chloride and also tetrakis(triphenylphosphine)rhodium hydride of the formula $(C_6H_5)_3P)_4$ RhH and the corresponding compounds in which all or part of the triphenylphosphine has been replaced by tricyclohexylphosphine. The catalyst can be employed in small amounts. An amount in the range 0.01-1% by weight, preferably in the range 0.03-0.5% by weight and particularly preferably in the range 0.1-0.3% by weight, based on the weight of the polymer, is suitable.

It is usually useful to use the catalyst together with a cocatalyst which is a ligand of the formula $R^1{}_mB$, where $R^1$, m and B have the meanings mentioned above for the catalyst. m is preferably 3, B is preferably phosphorous and the radicals $R^1$ can be identical or different. Preference is given to cocatalysts having three alkyl radicals, three cycloalkyl radicals, three aryl radicials, three aralkyl radicals, two aryl and one alkyl radical, two aryl and one cyclalkyl radical, two alkyl and one aryl radical, two alkyl and one cyclalkyl radical, two cycloalkyl and one aryl radical or two cycloalkyl and one monoaryl radical.

Examples of cocatalysts may be found, for example, in U.S. Pat. No. 4,631,315. A preferred cocatalyst is triphenylphosphine. The cocatalyst is preferably used in an amount in the range 0.3-5% by weight, preferably in the range 0.5-4% by weight, based on the weight of the nitrile rubber to be hydrogenated. Furthermore, the weight ratio of the rhodium-containing catalyst to the cocatalyst is in the range from 1:3 to 1:55, particularly preferably in the range from 1:5 to 1:45. Based on 100 parts by weight of the nitrile rubber to be hydrogenated, it is appropriate to use from 0.1 to 33 parts by weight of the cocatalyst, preferably from 0.5 to 20 parts by weight and very particularly preferably from 1 to 5 parts by weight, in particular more than 2 but less than 5 parts by weight, of cocatalyst per 100 parts by weight of the nitrile rubber to be hydrogenated.

The practical procedure for carrying out this hydrogenation is adequately known to those skilled in the art from U.S. Pat. No. 6,683,136. The hydrogenation is usually carried out by exposing the nitrile rubber to be hydrogenated in a solvent such as toluene or monochlorobenzene to hydrogen at a temperature in the range from 100 to 150° and a pressure in the range from 50 to 150 bar for from 2 to 10 hours.

For the purposes of the present invention, hydrogenation is a reaction of at least 50%, preferably 70-100%, particularly preferably 80-100%, of the double bonds present in the starting nitrile rubber. Particular preference is also given to residual contents of double bonds in the HNBR of from 0 to 8%.

When heterogenous catalysts are used, these are usually supported catalysts based on palladium which are, for example, supported on carbon, silica, calcium carbonate or barium sulphate.

After the hydrogenation is complete, a hydrogenated nitrile rubber having a Mooney viscosity (ML 1+4 at 100° C.), measured in accordance with ASTM standard D 1646, in the range 10-50, preferably from 10 to 30, is obtained. This corresponds to a weight average molecular weight $M_w$ in the range 2 000-400 000 g/mol, preferably in the range 20 000-200 000. Furthermore, the hydrogenated nitrile rubbers obtained have a polydispersity $PDI=M_w/M_n$, where $M_w$ is the weight average molecular weight and $M_n$ is the number average molecular weight, in the range 1-5 and preferably in the range 1.5-3.

The use of the catalysts of the invention leads to very good results in various forms of metathesis. When they are used for the degradation of nitrile rubbers, degraded nitrile rubbers having significantly reduced molecular weights $M_w$ and $M_n$ and good polydispersities can be obtained.

EXAMPLES

Catalysts of the prior art used in the following examples were:
"Grubbs III Catalyst":

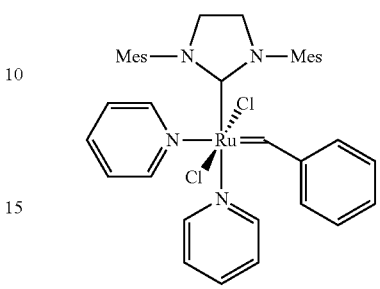

The Grubbs III catalyst was prepared as described in Angew. Chem. Int. Ed., 2002, 41(21), 4035.
"Grubbs II Catalyst":

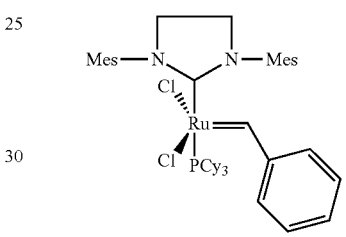

The Grubbs II catalyst was procured from Materia Inc. (Pasadena/Calif.).

I Preparation of the Catalysts of the Invention 1.1 Dichloro(fluorenylidene)bis(triphenylphosphine) ruthenium (1)

1.1.1 Fluorenone-tosylhydrazone (A)

(A method based on that of D. A. Van Galen, J. H. Barnes, M. D. Hawley *J. Org. Chem.* 1986, 51, 2544.)

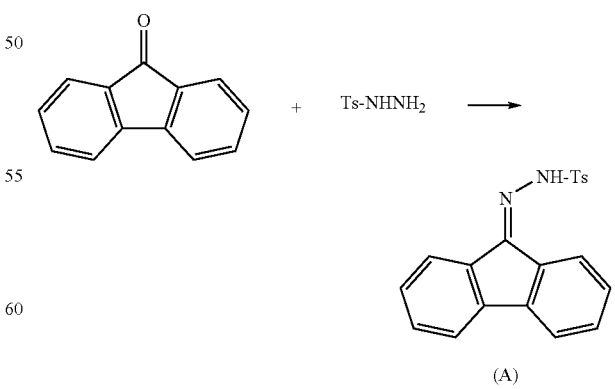

(A)

A mixture of 5.41 g of 9-fluorenone (30 mmol), 5.59 g of toluene-4-sulphonyl hydrazide (95% purity; 30 mmol) and 30 ml of ethanol was heated under reflux for 30 minutes. This gave a clear, yellow solution from which light-yellow crystals precipitate on cooling to room temperature. The crystals were filtered off, washed with 2×3 ml of ethanol and dried in air. The yield is 9.51 g (91%).

$^1$H NMR (300 MHz, CDCl$_3$): δ 8.37 (broad s, 1H), 7.97 (d, J=8.1 Hz, 2H), 7.87 (d, J=7.7 Hz, 1H), 7.72 (d, J=7.5 Hz, 1H), 7.65 (d, J=7.5 Hz, 1H), 7.54 (d, J=7.5 Hz, 1H), 7.45 (t, J=7.5 Hz, 1H), 7.39-7.30 (m, 4H), 7.26 (t, J=7.5 Hz, 1H), 2.41 (s, 3H).

1.1.2 9-diazofluorene (B)

(Method based on that of A. Jończyk, J. Wlostowska *Synth. Commun.* 1978, 8, 569.)

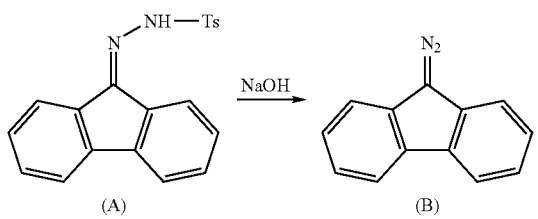

A mixture of 2.09 g of fluorenone tosylhydrazone (1) (6 mmol), 15 ml of dioxane and 2 ml of 50% strength aqueous NaOH was stirred vigorously at 85° C. for 1 hour. The original two-phase orange reaction mixture changed colour to red during this time. After only 10 minutes, TsNa begins to precipitate as a white precipitate. The reaction mixture was cooled to room temperature and admixed with 10 ml of water. The organic phase was separated off and the remaining aqueous phase was extracted with 2×6 ml of pentane. The combined organic phases were shaken with 2×4 ml of water. Without further drying, the solvents were removed under reduced pressure.

This gave 9-diazofluorene (2) as an orange powder in a yield of 1.08 g (94%).

$^1$H NMR (300 MHz, CDCl$_3$): δ 7.96 (dm, J=7.4 Hz, 2H), 7.52 (dm, J=7.5 Hz, 2H), 7.40 (dt, J=7.4 and 1.3 Hz, 2H), 7.33 (dt, J=7.4 and 1.3 Hz, 2H).

1.1.3 Preparation of dichloro(fluorenylidene)bis(triphenylphosphine)ruthenium (K1)

(As equimolar mixture of dichloro(fluorenylidene)bis(triphenylphosphine)ruthenium (K1) with fluorenylidenetriphenylphosphazine (P1) ("K1+P1"))

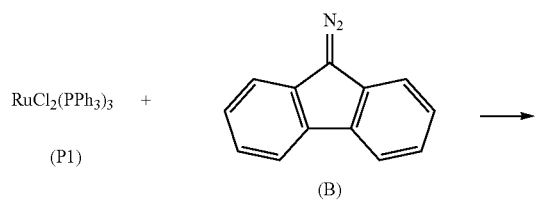

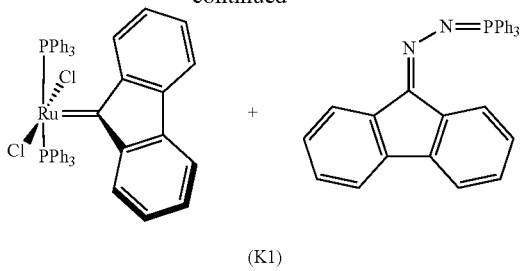

(K1)

1.918 g of RuCl$_2$(PPh$_3$)$_3$ (2.0 mmol) and 10 ml of dried CH$_2$Cl$_2$ were placed in a Schlenk vessel provided with a nitrogen atmosphere and magnetic stirrer bar. The solution formed was heated to 40° C. and a second solution of 0.769 g of 9-diazofluorene (4.0 mmol) in 10 ml of water-free CH$_2$Cl$_2$ was added dropwise over a period of 30 minutes. The mixture was subsequently stirred at 40° C. for another 80 minutes. The solvent was then removed in a high vacuum. The reaction product obtained contained the ruthenium carbene and phosphazine together with about 2.5 mol % of unreacted RuCl$_2$(PPh$_3$)$_3$ as could be shown by $^1$H NMR spectroscopy*. To purify the crude product, it was extracted thoroughly with 5×12 ml of a 1:2 mixture of benzene/hexane.

This gave 2.57 g (97% yield) of a rust-colored powder.

According to the $^1$H NMR spectrum, this powder comprised equimolar amounts of dichloro(fluorenylidene)bis(triphenylphosphine)ruthenium (K1) and fluorenylidenetriphenylphosphazine (P1), which corresponds to a carbene content of 65%. RuCl$_2$(PPh$_3$)$_3$ remained as impurity in a concentration of about 0.8 mol %.

1.1.4 Dichloro(fluorenylidene)bis(triphenylphosphine)ruthenium (K1)

The abovementioned mixture of dichloro(fluorenylidene)bis(triphenylphosphine)ruthenium and fluorenylidenetriphenylphosphazine (K1+P1) (1.40 g) was separated by column chromatography on silica gel (20 g) at −20° C. under a nitrogen atmosphere. Both the column and the eluent (toluene/THF 15:1) were cooled to −20° C. About 100 ml of a dark brown eluate were obtained, and removal of the solvent from this gave 0.33 g of crude product. This crude product fraction was still contaminated with triphenylphosphine and traces of RuCl$_2$(PPh$_3$)$_3$. Extraction with a benzene/hexane mixture (1:2) gave the pure product K1.

$^1$H NMR (500 MHz, CD$_2$Cl$_2$): δ 7.45 (m, 14H), 7.41 (t, J=7.5 Hz, 6H), 7.37 (d, J=7.7 Hz, 2H), 7.30 (d, J=7.3 Hz, 2H), 7.25 (t, J=7.7 Hz, 12H), 6.40 (dt, J=7.6 and 1.1 Hz, 2H).

$^{31}$P NMR (202 MHz, CD$_2$Cl$_2$): δ 32.2 (s).

$^{13}$C NMR (125 MHz, CD$_2$Cl$_2$): δ 303.2 (t, C=Ru, J$_{C-P}$=12.3 Hz), 147.8 (C), 139.0 (C), 135.4 (t, CH, J$_{C-P}$=5.4 Hz), 131.6 (d, CH, J$_{C-P}$=7.2 Hz), 130.8 (t, C, J$_{C-P}$=21.5 Hz), 130.5 (CH), 129.3 (CH), 128.2 (t, CH, J$_{C-P}$=4.8 Hz), 117.8 (CH).

Anal. calc. for C$_{49}$H$_{38}$Cl$_2$P$_2$Ru: C, 68.37; H, 4.45. found: C, 68.58; H, 4.53.

Crystals of the compound 1 suitable for X-ray structure analysis were obtained by slow evaporation of a benzene solution. Structure AA as shown in FIG. 1 shows the structure of the compound 1. Selected bond lengths (Å) are as follows: Ru—C1 1.862(3), Ru—Cl1 2.3505(8), Ru—Cl2 2.3487(8), Ru—P1 2.4070(8), Ru—P2 2.4066(9), C1-C2 1.479(4), C1-C13 1.501(4). Selected bond angles (°): C1-Ru—Cl1 99.49(9), C1-Ru—Cl2 99.28(9), Cl2-Ru—Cl1 161.23(3), C1-Ru—P1 100.53(8), C1-Ru—P2 99.03(8), C1-Ru—P2 99.03(8), Cl1-Ru—P1 84.98(3), Cl1-Ru—P2 92.42(3), Cl2-Ru—P1 91.62(3), Cl2-Ru—P2 84.62(3), P1-Ru—P2 160.43 (3), C2-C1-Ru 128.8(2), C13-C1-Ru 127.8(2), C2-C1-C13 103.3(2).

1.1.5 Fluorenylidenetriphenylphosphazine (P1)

The phosphazine which remained on the column in the abovementioned chromatography under 1.1.4 could be eluted by means of the more polar eluent mixture toluene/THF 5:1, likewise as a light-brown fraction. After evaporation of the eluent, the substance is obtained in the form of yellow crystals from a methylene chloride/hexane mixture. The structure was determined by means of X-ray crystal structure analysis.

$^1$H NMR (300 MHz, CDCl$_3$): δ 8.21 (d, J=7.7 Hz, 2H), 7.81 (dd, J=12.5 and 7.8 Hz, 6H), 7.67 (dt, J=7.2 and 1.2 Hz, 3H), 7.54 (dt, J=7.8 and 3.0 Hz, 6H), 7.03 (t, J=7.3 Hz, 2H), 6.92 (t, J=7.5 Hz, 2H), 6.38 (d, J=8.0 Hz, 2H).

$^{31}$P NMR (121 MHz, CDCl$_3$): δ 6.9 (s).

$^{13}$C NMR (75 MHz, CDCl$_3$): δ 141.6 (d, C, J$_{C-P}$=14.9 Hz), 134.2 (d, CH, J$_{C-P}$=10.2 Hz), 132.7 (d, CH, J$_{C-P}$=2.8 Hz), 130.8 (d, C, J$_{C-P}$=14.1 Hz), 129.1 (d, CH, J$_{C-P}$=12.2 Hz), 125.7 (d, C, J$_{C-P}$=88.5 Hz), 122.8 (CH), 119.4 (d, CH, J$_{C-P}$=1.5 Hz), 116.4 (CH), 115.9 (CH).

1.2 Dichloro(fluorenylidene)(1,3-dimesityldihydroimidazolylidene)(triphenylphosphine)ruthenium (K2)

(As equimolar mixture of dichloro(fluorenylidene)(1,3-dimesityldihydroimidazolylidene)(triphenylphosphine)ruthenium (K2) and Fluorenylidenetriphenylphosphazine (P1) ("K2+P1")

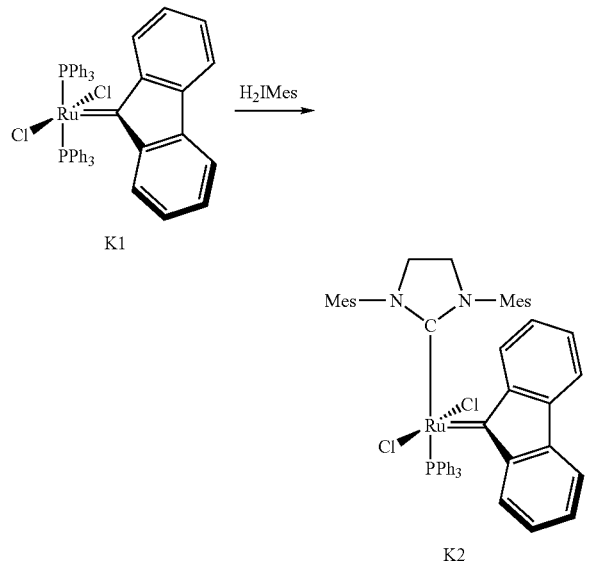

In a Schlenk vessel, 0.729 g of 1,3-dimesitylimidazolinium tetrafluoroborate (1.85 mmol) and 8 ml of dry tetrahydrofuran were mixed under a nitrogen atmosphere by means of a magnetic stirrer bar. This gave a suspension to which 89 mg of sodium hydride (60% dispersed in mineral oil; 2.22 mmol) are added slowly. The white suspension formed was stirred for two hours and then filtered. The filtrate was evaporated to dryness and the wax-like solid obtained was subsequently redissolved in 20 ml of dry diethyl ether.

This ether solution of 1,3-dimesityldihydroimidazolylidene was added dropwise to a suspension of a total of 2.44 g of an equimolar mixture of dichloro(fluorenylidene)bis(triphenylphosphine)ruthenium and fluorenylidenetriphenylphosphazine ("K1+P1") (65% purity; 1.84 mmol) in 20 ml of dry diethyl ether under a nitrogen atmosphere. The reaction solution was stirred at room temperature for 2 hours and then filtered. Thorough extraction of the crude product with 5×20 ml portions of diethyl ether led to removal of traces of dichloro(fluorenylidene)bis(1,3-dimesityldihydroimidazolylidene)ruthenium and unreacted dichloro(fluorenylidene)bis(triphenylphosphine)ruthenium.

1.91 g (75% yield) of a rust-colored powder remained.

According to the $^1$H NMR spectrum*, this material comprised equal amounts (mol/mol) of dichloro(fluorenylidene)(1,3-dimesityldihydroimidazolylidene)(triphenylphosphine) ruthenium and fluorenylidenetriphenylphosphazine ("K2+P1"), which corresponds to a content of K2 of 65%. The residual amount of dichloro(fluorenylidene)bis(triphenylphosphine)ruthenium (K1) is about 1%, and the amount of the by-product 1,3-dimesitylimidazolinium chloride likewise makes up about 1%.

1.2.2 Dichloro(fluorenylidene)(1,3-dimesityldihydroimidazolylidene)(triphenylphosphine) ruthenium (K2)

2.09 g of an equimolar mixture of dichloro(fluorenylidene)bis(triphenylphosphine)ruthenium (K1) and fluorenylidenetriphenylphosphazine (P1) (65% purity; 1.5 mmol) and 16 ml of dry CH$_2$Cl$_2$ were introduced under a nitrogen atmosphere into a Schlenk vessel. This solution was carefully covered with 50 ml of dry hexane and set aside for 2 days to allow it to crystallize. The yellow-brown precipitate was filtered off and another 1.0 g of a brown powder was obtained from the filtrate by evaporation of the solvent. The $^1$H NMR spectrum shows a molar ratio of the components K2:P1=3.4. Thorough washing with 5×30 ml of diethyl ether leaves 0.57 g of a pure product having a molar ratio of the components K2:P1=27, which corresponds to a content of K2 of 98%.

$^1$H NMR (500 MHz, CD$_2$Cl$_2$): δ 7.81 (d, J=7.7 Hz, 2H), 7.41 (t, J=7.1 Hz, 2H), 7.23 (t, J=7.3 Hz, 3H), 7.19 (s, 2H), 7.10 (d, J=7.3 Hz, 2H), 6.99 (dt, J=7.7 and 1.7 Hz, 6H), 6.92 (t, J=8.5 Hz, 6H), 6.64 (t, J=7.5 Hz, 2H), 5.86 (s, 2H), 4.02 (dd, J=11.8 and 8.9 Hz, 2H), 3.78 (dd, J=11.8 and 8.9 Hz, 2H), 2.76 (s, 6H), 2.51 (s, 3H), 1.85 (s, 3H), 1.84 (s, 6H).

$^{31}$P NMR (202 MHz, CD$_2$Cl$_2$): δ 26.9 (s).

$^{13}$C NMR (125 MHz, CD$_2$Cl$_2$): δ 302.9 (d, C=Ru, J$_{C-P}$=13.8 Hz), 212.1 (d, N—C—N, J$_{C-P}$=99.7 Hz), 148.5 (d, C, J$_{C-P}$=3.1 Hz), 139.6 (C), 139.2 (C), 138.6 (C), 137.0 (C), 136.9 (C), 136.5 (C), 136.2 (C), 134.9 (d, CH, J$_{C-P}$=9.8 Hz), 132.3 (C), 132.0 (C), 131.1 (CH), 130.4 (CH), 130.2 (CH), 129.6 (d, CH, J$_{C-P}$=1.9 Hz), 128.8 (CH), 128.4 (CH), 116.5 (CH), 52.5 (d, CH$_2$, J$_{C-P}$=3.9 Hz), 52.4 (d, CH$_2$, J$_{C-P}$=3.3 Hz), 21.5 (CH$_3$), 20.6 (CH$_3$), 19.4 (CH$_3$).

Anal. calc. for C$_{52}$H$_{49}$Cl$_2$N$_2$PRu: C, 69.02; H, 5.46; N, 3.10. found: C, 69.39; H, 5.61, N: 3.19.

Figure 2:
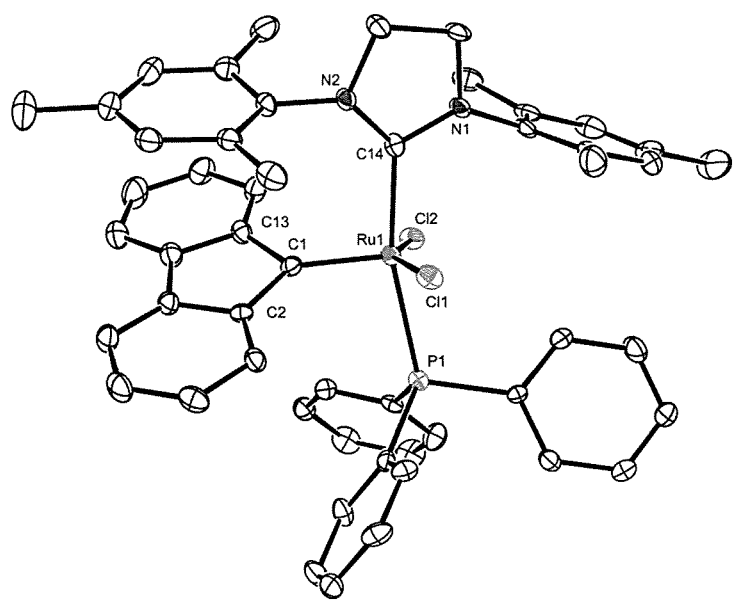
FIG. 2 Structure BB shows the x-ray crystal structure view of the compound 3.

Crystals of the compound 3 suitable for X-ray structure analysis were obtained from a benzene solution which had been covered with hexane. Structure BB as shown in FIG. 2 shows the structure of the compound 3. Selected bond lengths (Å) are as follows: Ru—C1 1.861(4), Ru—C14 2.088(4), Ru—Cl1 2.3686(10), Ru—Cl2 2.3608(10), Ru—P 2.4453 (11), C1-C2 1.502(5), C1-C13 1.493(5). Selected bond angles) (°): C1-Ru—C14 97.37(16), C1-Ru—Cl1 105.15(12), C1-Ru—Cl2 100.50(12), Cl2-Ru—Cl1 153.98 (4), C14-Ru—Cl1 85.13(10), C14-Ru—Cl2 95.98(10), C1-Ru—P 96.47(12), C14-Ru—P 165.99(11), Cl1-Ru—P 89.16(4), Cl2-Ru—P 83.62(4), C2-C1-Ru 128.5(3), C13-C1-Ru 127.2(3), C2-C1-C13 104.3(3), N1-C14-Ru 120.9(3), N2-C14-Ru 132.0(3).

1.3 Dichloro(fluorenylidene)(1,3-dimesityldihydroimidazolylidene)(pyridine)ruthenium (K3)

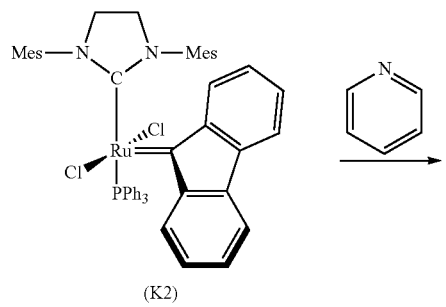

(K2)

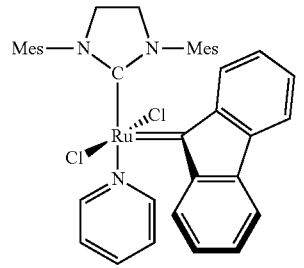

(K3)

138 mg of dichloro(fluorenylidene)(1,3-dimesityldihydroimidazolylidene)(triphenylphosphine)ruthenium (K2) (98% purity: 0.15 mmol) and 0.36 ml of pyridine (4.5 mmol) were introduced under a nitrogen atmosphere into a Schlenk vessel provided with a magnetic stirrer bar. The dark brown solution was stirred at room temperature for 30 minutes and 10 ml of dry hexane were subsequently added. A dark, yellow precipitate is formed, and the liquid is poured off from this. The precipitate was washed three times with 2 ml each time of hexane and dried under reduced pressure. Residual pyridine was removed by distillation with methylene chloride.

This gave 97 mg of the catalyst K3, corresponding to a yield of 90%.

$^1$H NMR (500 MHz, CD$_2$Cl$_2$): δ 8.08 (d, J=7.6 Hz, 1H), 7.86 (d, J=5.5 Hz, 1H), 7.49 (dt, J=7.4 and 1.0 Hz, 2H), 7.44 (t, J=7.6 Hz, 1H), 7.14 (s, 2H), 7.13 (d, J=6.3 Hz, 2H), 6.94 (m, 4H), 6.08 (s, 2H), 4.08 (dd, J=11.6 and 8.8 Hz, 2H), 3.81 (dd, J=11.6 and 8.8 Hz, 2H), 2.83 (s, 6H), 2.35 (s, 3H), 1.93 (s, 3H), 1.89 (s, 6H).

$^{13}$C NMR (125 MHz, CD$_2$Cl$_2$): δ 301.3 (C=Ru), 210.5 (N—C—N), 153.0 (CH), 148.5 (C), 139.9 (C), 139.2 (C), 137.0 (C), 136.8 (CH), 136.7 (C), 135.6 (C), 135.5 (C), 130.6 (CH), 130.4 (CH), 129.7 (CH), 129.4 (CH), 128.5 (CH), 123.9 (CH), 117.1 (CH), 53.0 (CH$_2$), 51.2 (CH$_2$), 21.2 (CH$_3$), 21.0 (CH$_3$), 20.7 (CH$_3$), 19.3 (CH$_3$).

Anal. calc. for C$_{39}$H$_{39}$Cl$_2$N$_3$Ru: C, 64.90; H, 5.45; N, 5.82. found: C, 65.02; H, 5.52, N: 5.78.

Figure 3:
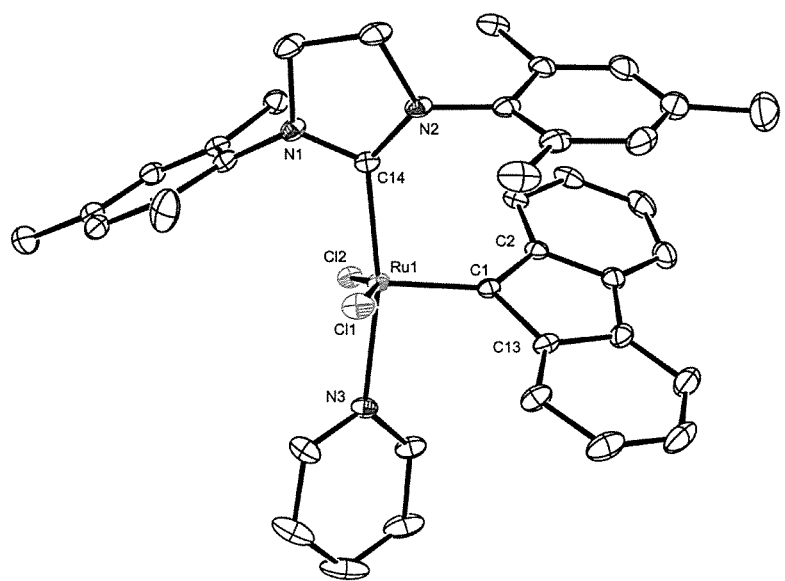
FIG. 3 Structure CC shows the x-ray crystal structure view of the compound 4.

Crystals of the compound 4 suitable for X-ray structure analysis were obtained from a benzene solution covered with hexane. Structure CC as shown in FIG. 3 shows the structure of the compound 4.

Selected bond lengths (Å) are as follows: Ru—C1 1.860 (2), Ru—C14 2.068(2), Ru—Cl1 2.3587(6), Ru—Cl2 2.3635 (6), Ru—N3 2.144(2), C1-C2 1.487(3), C1-C13 1.493(3). Selected bond angles) (°): C1-Ru—C14 99.41(10), C1-Ru—Cl1 101.97(7), C1-Ru—Cl2 97.78(7), Cl2-Ru—Cl1 158.52 (3), C14-Ru—Cl1 85.58(6), C14-Ru—Cl2 99.50(6), C1-Ru—N3 92.70(9), C14-Ru—N3 166.75(9), Cl1-Ru—N3 86.65(6), Cl2-Ru—N3 84.06(6), C2-C1-Ru 127.59(17), C13-C1-Ru 126.94(18), C2-C1-C13 104.8(2), N1-C14-Ru 118.82(18), N2-C14-Ru 131.59(18).

1.4 Mixture of dichloro(fluorenylidene)(1,3-dimesityldihydroimidazolylidene)(pyridine)ruthenium (K3) and fluorenylidenetriphenylphosphazine ("K3+P1")

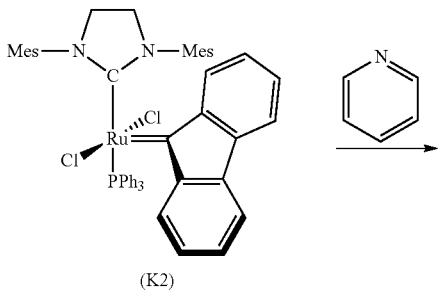

(K2)

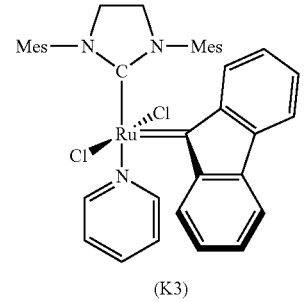

(K3)

338 mg of a mixture of dichloro(fluorenylidene)(1,3-dimesityldihydroimidazolylidene)-(triphenylphosphine)ruthenium and fluorenylidenetriphenylphosphazine (K2+P1) (65% purity; 0.24 mmol) and 0.97 ml of pyridine (12 mmol) were introduced under a nitrogen atmosphere into a Schlenk vessel provided with a magnetic stirrer bar. The brown suspension obtained was stirred at room temperature for 30 minutes and 20 ml of dry hexane were subsequently added. The liquid was decanted off from the yellow-brown precipitate and the precipitate was subsequently washed with 3×2 ml of hexane. Drying under reduced pressure gave 242 mg of the mixture K3+P1 (73% yield). According to the $^1$H NMR spectrum*, the molar ratio of K3:P1=0.69, which corresponds to a content of K3 of 52%.

1.5 Dichloro(fluorenylidene)(1,3-dimesityldihydroimidazolylidene)(3-bromopyridine) ruthenium (K4)

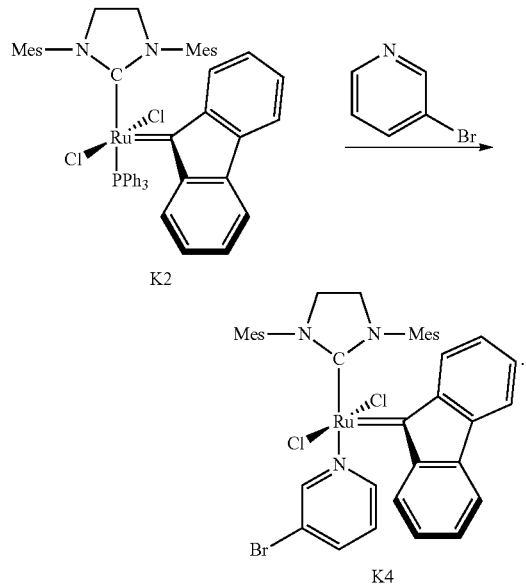

The procedure described under paragraph 1.3 was repeated using 0.37 ml of 3-bromopyridine (3.75 mmol) to give dichloro(fluorenylidene)(1,3-dimesityldihydroimidazolylidene)(3-bromopyridine)ruthenium (K4) as an orange-brown product in a yield of 111 mg (92%).

$^1$H NMR (500 MHz, CD$_2$Cl$_2$): δ 8.27 (d, J=2.1 Hz, 1H), 8.05 (d, J=7.5 Hz, 2H), 7.59 (dm, J=8.2 Hz, 1H), 7.52 (dd, J=5.3 and 1.2 Hz, 1H), 7.50 (dt, J=7.3 and 1.0 Hz, 6H), 7.14 (s, 2H), 7.13 (d, J=7.7 Hz, 2H), 6.95 (dt, J=7.5 and 1.1 Hz, 2H), 6.76 (dd, J=8.0 and 5.6 Hz, 1H), 6.08 (s, 2H), 4.09 (dd, J=11.4 and 8.8 Hz, 2H), 3.82 (dd, J=11.4 and 8.8 Hz, 2H), 2.81 (s, 6H), 2.36 (s, 3H), 1.93 (s, 3H), 1.88 (s, 6H).

$^{13}$C NMR (125 MHz, CD$_2$Cl$_2$): δ 302.0 (C=Ru), 209.5 (N—C—N), 153.1 (CH), 152.0 (CH), 148.4 (C), 140.1 (C), 139.5 (CH), 139.3 (C), 139.1 (C), 137.0 (C), 136.7 (C), 135.5 (C), 135.3 (C), 130.7 (CH), 130.4 (CH), 129.7 (CH), 129.4 (CH), 128.6 (CH), 124.8 (CH), 119.5 (C), 117.2 (CH), 53.1 (CH$_2$), 51.1 (CH$_2$), 21.3 (CH$_3$), 21.0 (CH$_3$), 20.6 (CH$_3$), 19.3 (CH$_3$).

Anal. calc. for C$_{39}$H$_{38}$BrCl$_2$N$_3$Ru: C, 58.51; H, 4.78; N, 5.25. found: C, 58.62; H, 4.82, N, 5.18.

Figure 4:
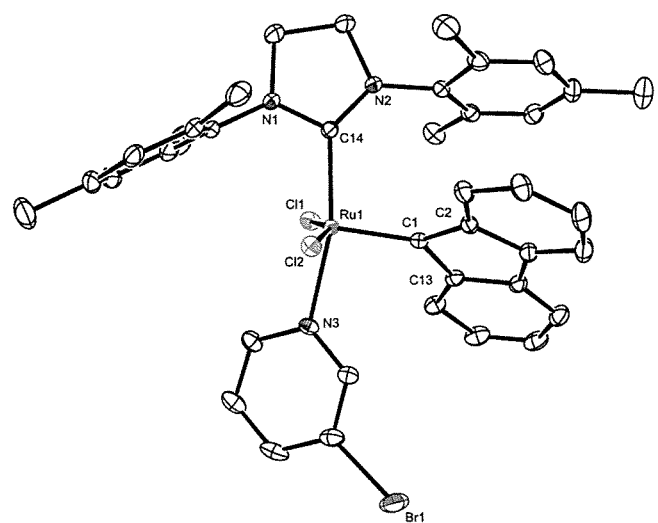
FIG. 4 Structure DD shows the x-ray crystal structure view of the compound 5.

Crystals of the catalyst K4 suitable for X-ray structure analysis were obtained from a benzene solution covered with hexane. Structure DD as shown in FIG. 4 shows the structure of the compound 5. Selected bond lengths (Å) are as follows: Ru—C1 1.8570(16), Ru—C14 2.0510(16), Ru—Cl1 2.3681 (4), Ru—Cl2 2.3678(4), Ru—N3 2.1538(14), C1-C2 1.496 (2), C1-C13 1.501(2). Selected bond angles) (°): C1-Ru—C14 99.68(7), C1-Ru—Cl1 102.71(5), C1-Ru—Cl2 96.91 (5), Cl2-Ru—Cl1 158.268(16), C14-Ru—Cl1 85.63(5), C14-Ru—Cl2 100.29(5), C1-Ru—N3 93.85(6), C14-Ru—N3 165.25(6), Cl1-Ru—N3 85.68(4), Cl2-Ru—N3 83.76(4), C2-C1-Ru 128.59(12), C13-C1-Ru 126.73(12), C2-C1-C13 104.05(13), N1-C14-Ru 117.10(12), N2-C14-Ru 134.76(12).

1.6 Mixture of dichloro(fluorenylidene)(1,3-dimesityldihydroimidazolylidene)(3-bromopyridine)ruthenium and fluorenylidenetriphenylphosphazine (K4+P1)

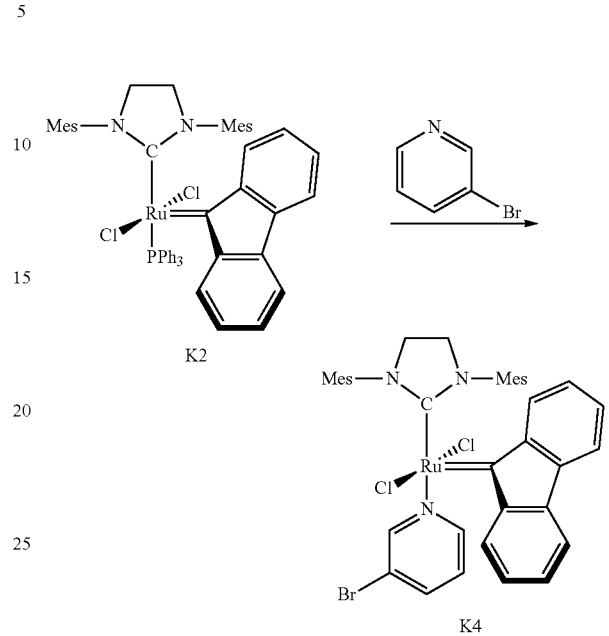

The procedure described above under paragraph 1.4 was repeated using 0.73 ml of 3-bromopyridine (7.5 mmol) as starting material to give 300 mg of the mixture of dichloro(fluorenylidene)(1,3-dimesityldihydroimidazolylidene)(3-bromopyridine)-ruthenium and fluorenylidenetriphenylphosphazine (K4+P1) as an orange-brown product (83% yield). According to the $^1$H NMR spectrum*, the molar ratio of K4:P1=0.78, corresponding to a content of K4 of 57%.

1.7 Dichloro(fluorenylidene)(1,3-dimesityldihydroimidazolylidene)(3-nitropyridine)ruthenium (K5)

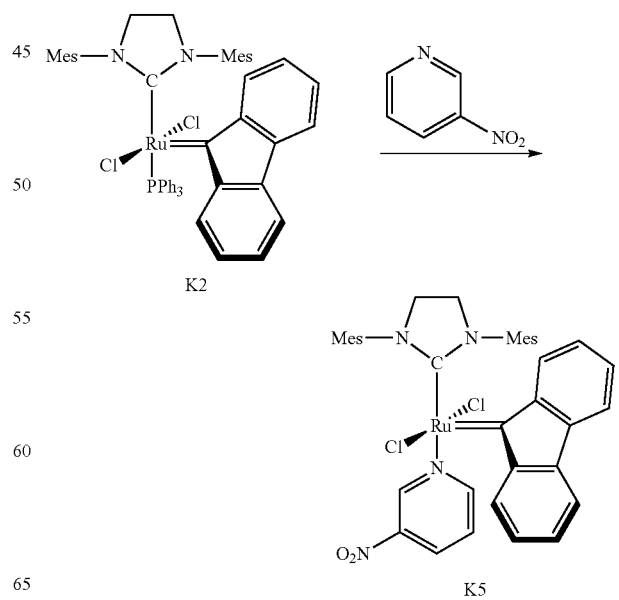

138 mg of dichloro(fluorenylidene)(1,3-dimesityldihydroimidazolylidene)-(triphenylphosphine)ruthenium K2 (98% purity; 0.15 mmol), 465 mg of 3-nitropyridine (3.75 mmol) and 1.0 ml of toluene were introduced under a nitrogen atmosphere into a Schlenk vessel provided with a magnetic stirrer bar. The brown suspension was stirred at room temperature for one hour and 10 ml of dry hexane were then added. The liquid was decanted off from the orange-red precipitate and the precipitate was washed with 3×2 ml of hexane and dried under reduced pressure. Residual 3-nitropyridine could be removed by firstly dissolving the precipitate in 0.2 ml of dichloromethane and subsequently precipitating it again by addition of 2 ml of hexane.

This gave 103 mg of the pure product dichloro(fluorenylidene)(1,3-dimesityldihydroimidazolylidene)(3-nitropyridine)ruthenium (K5) (90% yield).

$^1$H NMR (500 MHz, CD$_2$Cl$_2$): δ 9.30 (s, 1H), 8.24 (d, J=7.8 Hz, 1H), 8.00 (d, J=7.6 Hz, 2H), 7.74 (d, J=5.2 Hz, 1H), 7.50 (t, J=7.3 Hz, 2H), 7.14 (s, 2H), 7.13 (d, J=8.3 Hz, 2H), 7.04 (m, 1H), 6.94 (t, J=7.5 Hz, 2H), 6.08 (s, 2H), 4.11 (t, J=10.1 Hz, 2H), 3.84 (t, J=10.1 Hz, 2H), 2.82 (s, 6H), 2.32 (s, 3H), 1.93 (s, 3H), 1.89 (s, 6H).

$^{13}$C NMR (125 MHz, CD$_2$Cl$_2$): δ 302.5 (C═Ru), 208.7 (N—C—N), 159.0 (CH), 148.4 (C), 147.9 (CH), 143.9 (C), 139.9 (C), 139.4 (C), 139.1 (C), 137.1 (C), 136.8 (C), 135.4 (C), 135.2 (C), 131.6 (CH), 131.0 (CH), 130.4 (CH), 129.8 (CH), 129.4 (CH), 128.7 (CH), 124.2 (CH), 117.3 (CH), 53.0 (CH$_2$), 51.2 (CH$_2$), 21.2 (CH$_3$), 21.0 (CH$_3$), 20.6 (CH$_3$), 19.4 (CH$_3$).

Anal. calc. for C$_{39}$H$_{38}$Cl$_2$N$_4$O$_2$Ru: C, 61.09; H, 5.00; N, 7.31. found: C, 60.74; H, 4.89, N, 7.27.

Figure 5:
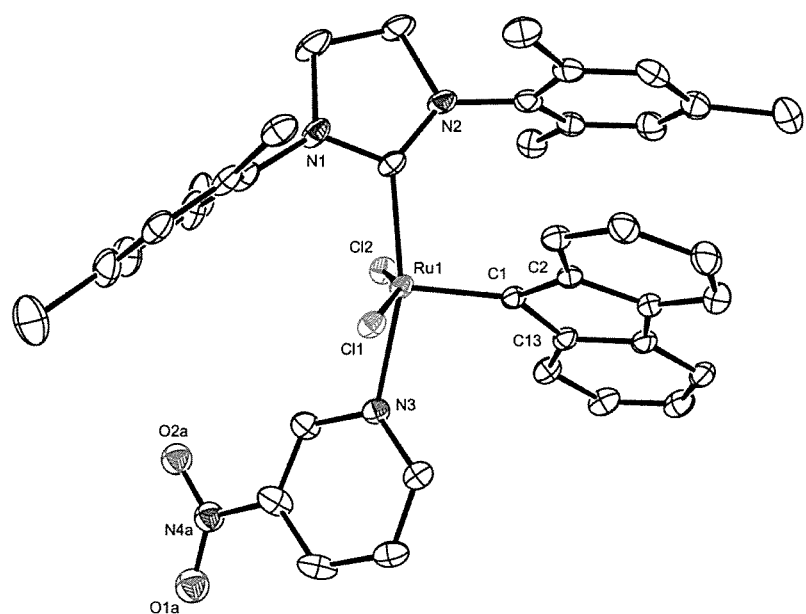
FIG. 5 Structure EE shows the x-ray crystal structure view of the compound 6.

Crystals of the compound 6 suitable for X-ray structure analysis were obtained from a benzene solution covered with hexane. Structure EE as shown in FIG. 5 shows the structure of the compound 6. Selected bond lengths (Å) are as follows: Ru—C1 1.854(6), Ru—C14 2.042(6), Ru—Cl1 2.3597(14), Ru—Cl2 2.3705(15), Ru—N3 2.139(5), C1-C2 1.492(8), C1-C13 1.491(8).

Selected bond angles) (°): C1-Ru—C14 100.0(3), C1-Ru—Cl1 96.15(19), C1-Ru—Cl2 102.39(19), Cl2-Ru—Cl1 159.14(6), C14-Ru—Cl1 100.03(16), C14-Ru—Cl2 86.19(17), C1-Ru—N3 96.3(2), C14-Ru—N3 163.3(2), Cl1-Ru—N3 81.95(14), Cl2-Ru—N3 86.57(14), C2-C1-Ru 127.2(4), C13-C1-Ru 128.0(5), C2-C1-C13 104.2(5), N1-C14-Ru 116.2(5), N2-C14 Ru 134.2(4).

1.8 Mixture of dichloro(fluorenylidene)(1,3-dimesityldihydroimidazolylidene)(3-nitropyridine)ruthenium and fluorenylidenetriphenylphosphazine (K5+P1)

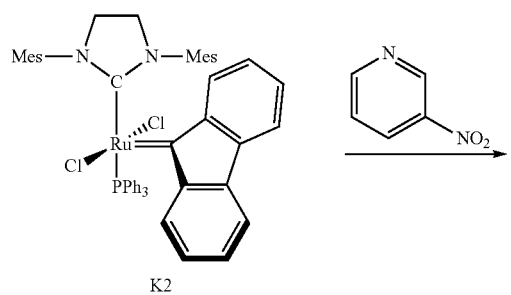

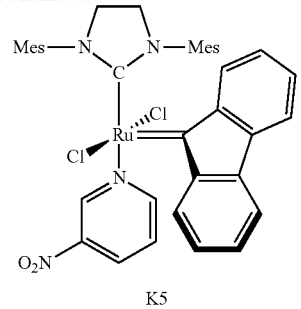

169 mg of a mixture of dichloro(fluorenylidene)(1,3-dimesityldihydroimidazolylidene)-(triphenylphosphine)ruthenium and fluorenylidenetriphenylphosphazine ("K2+P1") (65% purity; 0.12 mmol) and also 372 mg of 3-nitropyridine (3 mmol) and 0.8 ml of toluene were introduced under a nitrogen atmosphere into a Schlenk vessel provided with a magnetic stirrer bar. The brown suspension was stirred at room temperature for one hour and 8 ml of dry hexane were then added. The liquid was decanted off from the red-brown precipitate and the precipitate was washed with 3×1 ml of hexane and dried under reduced pressure.

This gave 139 mg of the mixture of dichloro(fluorenylidene)(1,3-dimesityldihydroimidazolylidene)(3-nitropyridine)ruthenium and fluorenylidenetriphenylphosphazine (K5+P1) (82% yield). According to the NMR spectrum*, the molar ratio of K5:P1=0.73, corresponding to a content of K5 of 55%.

Explanations of all "*":

The mixing ratio was in each case determined by means of the following $^1$H NMR signals (300 MHz, CD$_2$Cl$_2$): RuCl$_2$(PPh$_3$)$_3$ (18H at 7.01 ppm), 1 (2H at 6.40 ppm), phosphazine 2 (2H at 6.33 ppm), 3 (2H at 5.86 ppm), 4 (2H at 6.08 ppm), 5 (2H at 6.08 ppm), 6 (2H at 6.08 ppm). The content of 1,3-dimesitylimidazolinium chloride was determined via the ratio of the integrals for the hydrogen atoms: 4H at 4.4 ppm compared to the 4H of the carbene at 4.02 and 3.78 ppm. Unreacted dichloro(fluorenylidene)bis(triphenylphosphine)ruthenium could be determined by means of its $^{31}$P NMR spectrum. The ratio of the integrals for the 2P atoms at 31.3 ppm compared to 1P of the compound 3 at 26.0 ppm was employed.

Metathesis Reactions in which the Catalysts According to the Invention are Used:

A "Ring-Closing Metathesis" Under an Inert Gas Atmosphere

The suitability of the catalysts prepared according to the invention for the ring-closing metathesis of diethyl diallylmalonate and diallylmalononitrile is demonstrated in the following examples.

For this purpose, an NMR tube with attached Young valve was filled as follows in a glove box, 24.0 mg of diethyl diallylmalonate or 14.6 mg of diallylmalononitrile (0.1 mmol in each case) in 0.6 ml of CD$_2$Cl$_2$ served as substrate. 0.10 ml (1 μmmol; 1 mol %) of a catalyst solution (5 μmmol of catalyst in 0.50 ml of CD$_2$Cl$_2$) was added at 23-25° C. The reaction to form the cyclopentene derivatives was monitored by means of $^1$H NMR spectroscopy; the amounts were determined by integrals of the signals for the methylene protons of the starting materials (2.61 ppm for diethyl diallylmalonate, 2.70 ppm for diallylmalononitrile) and the products (2.98 ppm for diethyl-3-cyclopentene-1,1-dicarboxylate, 3.22 ppm for 3-cyclopentene-1,1-dicarbonitrile). A possible superatmospheric pressure due to ethylene formed was carefully released.

The results are shown in Tables A1 and A2 below.

A3 Ring-Closing Mtathesis of Diethyl Diallylmalonate (DEDAM) Under Aerobic Conditions The following experiments show that the catalysts of the invention catalyse the ring-closing metathesis of DEDAM under aerobic conditions and that the ring-closing metathesis of DEDAM is influenced positively by additions of $CaCl_2$.

A1 Ring-closing metathesis of diethyl diallylmalonate under an inert gas atmosphere

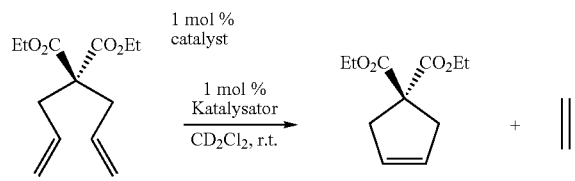

| | Comparison | | Catalysts according to the invention | | | | | |
|---|---|---|---|---|---|---|---|---|
| Example | 1 | 2 | 3 | 4 | 5 | 6 | 7 | 8 | 9 |
| | | | Catalyst/catalyst mixture used | | | | | |
| Time [min] | Grubbs II | Grubbs III | K2 | K2 + P1 | K3 | K4 | K5 | K3 + P1 | K4 + P1 |
| | | | | CONVERSION [%] | | | | | |
| 5 | 53.5 | 68.2 | 96.3 | 74.7 | 92.3 | 93.9 | 92.9 | 83.4 | 89.8 |
| 10 | 68.0 | 79.0 | 99.0 | 86.9 | 96.4 | 97.9 | 96.8 | 90.4 | 94.2 |
| 15 | 78.1 | 84.7 | 99.7 | 94.3 | 97.6 | 99.2 | 98.1 | 93.7 | 96.3 |
| 20 | 86.8 | 88.5 | — | 96.4 | 98.2 | 99.5 | 98.7 | 95.1 | 97.2 |
| 25 | 91.3 | 90.8 | — | 97.8 | 98.3 | 99.7 | 99.0 | 96.0 | 97.7 |
| 30 | 94.2 | 92.8 | — | 98.6 | 98.4 | — | 99.1 | 96.5 | 98.0 |
| 45 | 97.8 | 95.8 | — | 99.4 | 98.4 | — | 99.3 | 97.4 | 98.5 |
| 60 | 99.1 | 97.4 | — | 99.6 | 98.5 | — | 99.5 | 97.6 | 98.8 |

A2 Ring-closing metathesis of diallylmalononitrile under an inert gas atmosphere

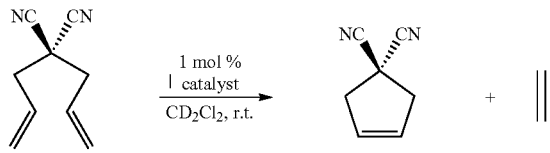

| | Comparison | | Catalysts according to the invention | | | | | |
|---|---|---|---|---|---|---|---|---|
| Example | 1 | 1 | 1 | 2 | 3 | 4 | 5 | 6 | 7 |
| | | | Catalyst/catalyst mixture used | | | | | |
| Time [min] | Grubbs II | Grubbs III | K2 | K2 + P1 | K3 | K4 | K5 | K3 + P1 | K4 + P1 |
| | | | | CONVERSION [%] | | | | | |
| 5 | 36.1 | 70.3 | 77.3 | 61.2 | 76.2 | 87.8 | 89.6 | 68.0 | 87.1 |
| 10 | 48.0 | 79.7 | 83.7 | 70.2 | 82.3 | 92.6 | 93.1 | 76.4 | 90.9 |
| 15 | 56.3 | 84.7 | 86.0 | 75.9 | 86.8 | 94.7 | 94.7 | 80.9 | 93.1 |
| 20 | 63.8 | 88.0 | 88.1 | 79.0 | 89.0 | 95.8 | 95.5 | 83.9 | 94.2 |
| 25 | 69.1 | 90.5 | 89.4 | 80.7 | 90.5 | 96.4 | 96.1 | 85.7 | 95.1 |
| 30 | 73.5 | 92.0 | 90.0 | 82.0 | 91.4 | 96.7 | 96.4 | 87.3 | 95.6 |
| 45 | 82.1 | 94.6 | 90.6 | 83.3 | 93.9 | 97.3 | 96.7 | 89.8 | 96.4 |
| 60 | 86.5 | 96.0 | 90.8 | 83.4 | 94.8 | 97.5 | 96.7 | 91.1 | 96.8 |

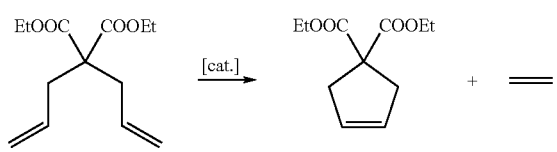

The ring-closing metathesis of diethyl diallylmalonate was carried out using the catalyst according to the invention with and without addition of $CaCl_2$ without any particular measures for the exclusion of air and moisture. The experiments were carried out using 0.151 ml (0.625 mmol) of DEDAM, catalyst and amounts as indicated in the following tables, 0.3 ml of chlorobenzene, 0.2 ml of $CDCl_3$ and 1 mg of $CaCl_2$ in each case.

To carry out the experiments, the catalysts and amounts indicated in the tables were weighed into a test tube in a glove box being closed in the glove box by means of a septum. Outside the glove box, 0.3 ml of undeuterated chlorobenzene which had not been saturated with nitrogen was added to the catalyst by means of a syringe to dissolve the catalyst. The catalyst solution was transferred in air by means of a syringe to an NMR tube. The test tube was subsequently rinsed in air with 0.2 ml of deuterated chloroform ($CDCl_3$) and transferred by means of a syringe into the NMR tube. In the experiments with additions of $CaCl_2$, about 1 mg of calcium chloride was additionally introduced into the NMR tube. The reaction was started at room temperature by addition of 0.151 ml (0.625 mmol) of DEDAM (ALDRICH). $^1H$ NMR spectra were recorded at defined intervals in order to determine the conversion in the reaction.

B Use of the Catalysts According to the Invention for the Metathesis of Nitrile Rubber The degradation reactions in the series of experiments 1 to 5 described below were carried out using the nitrile rubber Perbunan® NT 3435 from Lanxess Deutschland GmbH. This nitrile rubber had the following characteristic properties:

| | |
|---|---|
| Acrylonitrile content: | 34% by weight |
| Mooney viscosity (ML 1 + 4 @ 100° C.): | 35 Mooney units |
| Residual moisture content | 1.8% by weight |
| $M_w$: | 186 000 g/mol |
| $M_n$: | 60 000 g/mol |
| PDI ($M_w/M_n$): | 3.1 |

The metathetic degradation was in each case carried out using 293 g of chlorobenzene (hereinafter referred to as "MCB"/from Acros Organics) without further purification steps. 40.0 g of NBR were dissolved therein at room temperature over a period of 10 hours. 800 mg (2 phr) of 1-hexene were in each case added to the NBR-containing solution and the mixture was homogenized by stirring for 10 minutes.

The metathesis reaction was carried out at room temperature using the catalysts specified in the following table and in each case once without and once with 800 mg (2 phr) of calcium chloride. The catalysts were in each case dissolved in 10 g of MCB at room temperature under argon. The catalyst solutions were added to the NBR solutions in MCB immediately after preparation of the catalyst solutions. Samples of about 5 ml of the reaction solutions were taken after 30, 60, 90, 180 and 420 minutes and immediately admixed with

TABLE A3

Ring-closing metathesis of diethyl diallylmalonate

| Example | Catalyst used | Amount used [mg] | Catalyst (excluding P1) [mol] | $CaCl_2$-addition [mg] |
|---|---|---|---|---|
| 2.01 | K2 + P1 | 15.4 | $11.05 \cdot 10^{-6}$ | — |
| 2.02 | K2 + P1 | 15.4 | $11.05 \cdot 10^{-6}$ | 1 |
| 3.01 | K3 + P1 | 16.4 | $11.80 \cdot 10^{-6}$ | — |
| 3.02 | K3 + P1 | 16.4 | $11.80 \cdot 10^{-6}$ | 1 |
| 4.01 | K4 + P1 | 12.9 | $9.15 \cdot 10^{-6}$ | — |
| 4.02 | K4 + P1 | 12.9 | $9.15 \cdot 10^{-6}$ | 1 |
| 5.01 | K5 + P1 | 16.4 | $11.80 \cdot 10^{-6}$ | — |
| 5.02 | K5 + P1 | 16.4 | $11.80 \cdot 10^{-6}$ | 1 |

| Experiment No. | | | | | | | |
|---|---|---|---|---|---|---|---|
| 2.01 | 2.02 | 3.01 | 3.02 | 4.01 | 4.02 | 5.01 | 5.02 |
| Catalyst | | | | | | | |
| K2 + P1 | K2 + P1 | K3 + P1 | K3 + P1 | K4 + P1 | K4 + P1 | K5 + P1 | K5 + P1 |
| | | | $CaCl_2$ | | | | |

| Time [min] | — | $CaCl_2$ | — | $CaCl_2$ | — | $CaCl_2$ | — | $CaCl_2$ |
|---|---|---|---|---|---|---|---|---|
| | | | | Conversions [%] | | | | |
| 0 | 0 | 0 | 0 | 0 | 0 | 0 | 0 | 0 |
| 5 | 45.9 | 84.2 | 68.7 | 76.5 | 63.2 | 88.9 | 44.9 | 61.5 |
| 15 | 95.3 | 100 | 72.9 | 77.5 | 70.7 | 91.3 | 55.1 | 71.4 |
| 30 | 100 | 100 | 76.4 | 78 | 73.2 | 92.3 | 59.4 | 72.1 |
| 60 | | | 77.9 | 79.4 | 74.2 | 92.4 | 59.9 | 72.2 |
| 90 | | | 78.3 | 80.5 | 74.9 | 92.8 | 61.2 | 72.5 |
| 150 | | | 78.9 | 83.1 | 75.4 | 92.8 | 62.7 | 72.2 | about 0.5 ml of ethyl vinyl ether to stop the reaction. 2 ml were taken from each of the solutions and diluted with 3 ml of DMAc. To carry out the GPC analysis, the solutions were in each case filtered through a 0.2 µm syringe filter made of Teflon (Chromafil PTFE 0.2 µm; from Macherey-Nagel). The GPC analysis was subsequently carried out at 80° C. using a PLgel preliminary column and two 300×7.5 mm Resipore 3 µm PE columns from Polymer Laboratories (Pump: Waters Model 510).

Cabliration of the GPC columns was carried out using linear poly(styrene) standards from Polymer Standards Services. An RI detector from Waters (Waters 410) was used as detector. The analysis was carried out at a flowrate of 1.0 ml/min using DMAc (containing 0.075 mol/l of LiBr) as eluent. Evaluation of the GPC curves was carried out using software from Polymer Laboratories.

The following characteristic properties were determined both for the original NBR rubber (before degradation) and for the degraded nitrile rubbers by means of GPC analysis:

| | |
|---|---|
| $M_w$/(kg/mol): | Weight average molar mass |
| $M_n$/(kg/mol): | Number average molar mass |
| PDI: | Width of the molar mass distribution ($M_w/M_n$) |

NBR Degradation Using Ru-Fluorenylidene Complexes: Overview of the Examples According to the Invention and Comparative Examples

| Experiment | Catalyst/catalyst mixture | | | | CaCl$_2$ Amount [mg] |
|---|---|---|---|---|---|
| | Type | Amount used [mg] | Amount of catalyst (excluding P1) mol | | |
| 1.01 | Comparison | Grubbs-II | 20.0 | 23.6 · 10⁻⁶ | |
| 1.02 | Comparison | Grubbs-II | 20.0 | 23.6 · 10⁻⁶ | 800 |
| 2.01 | According to the invention | 3 + 2 | 32.8 | 23.6 · 10⁻⁶ | |
| 2.02 | According to the invention | 3 + 2 | 32.8 | 23.6 · 10⁻⁶ | 800 |
| 3.01 | According to the invention | 4 + 2 | 32.8 | 23.6 · 10⁻⁶ | |
| 3.02 | According to the invention | 4 + 2 | 32.8 | 23.6 · 10⁻⁶ | 800 |
| 4.01 | According to the invention | 5 + 2 | 33.1 | 23.6 · 10⁻⁶ | |
| 4.02 | According to the invention | 5 + 2 | 33.1 | 23.6 · 10⁻⁶ | 800 |
| 5.01 | According to the invention | 6 + 2 | 32.9 | 23.6 · 10⁻⁶ | |
| 5.02 | According to the invention | 6 + 2 | 32.9 | 23.6 · 10⁻⁶ | 800 |

1.00 Comparative Experiments Using Grubbs II Catalyst 1.01 Comparative Experiment Using Grubbs II Catalyst without Addition of a Salt

| Catalyst | | | Salt | |
|---|---|---|---|---|
| | Amount/mg | Amount of active compound/mol | Type | Amount/mg |
| Grubbs-II | 20.0 | 23.6 · 10⁻⁶ | — | — |

| | Reaction time/min | | | | |
|---|---|---|---|---|---|
| Analytic data | 0 | 30 | 60 | 90 | 180 | 420 |
| $M_w$/(kg/mol) | 186 | 117 | 99.9 | 84.4 | 64.9 | 53.8 |
| $M_n$/(kg/mol) | 60.0 | 48.9 | 41.8 | 40.2 | 33.9 | 29.3 |
| PDI | 3.1 | 2.4 | 2.4 | 2.1 | 1.9 | 1.8 |

1.02 Comparative Experiment Using Grubbs II Catalyst with Addition of CaCl$_2$

| Catalyst | | | Salt | |
|---|---|---|---|---|
| | Amount/mg | Amount of active compound/mol | Type | Amount/mg |
| Grubbs-II | 20.0 | 23.6 · 10⁻⁶ | CaCl$_2$ | 800 |

| | Reaction time/min | | | | |
|---|---|---|---|---|---|
| Analytic data | 0 | 30 | 60 | 90 | 180 | 420 |
| $M_w$/(kg/mol) | 186 | 84.4 | 61.8 | 44.2 | 25.2 | 16.8 |
| $M_n$/(kg/mol) | 60.0 | 39.9 | 31.4 | 25.2 | 14.6 | 10.8 |
| PDI | 3.1 | 2.2 | 2.0 | 1.8 | 1.7 | 1.6 |

2.00 Experiments According to the Invention Using the Mixture K2+P1

2.01 Experiment According to the Invention Using the Mixture K2+P1 without Addition of a Salt

| Catalyst | | | Salt | |
|---|---|---|---|---|
| | Amount/mg | Amount of active compound/mol | Type | Amount/mg |
| K2 + P1 | 32.8 | 23.6 · 10⁻⁶ | — | — |

| | Reaction time/min | | | | |
|---|---|---|---|---|---|
| Analytic data | 0 | 30 | 60 | 90 | 180 | 420 |
| $M_w$/(kg/mol) | 186 | 67.8 | 61.8 | 63.7 | 63.7 | 61.1 |
| $M_n$/(kg/mol) | 60.0 | 32.8 | 30.7 | 31.5 | 32.3 | 31.3 |
| PDI | 3.1 | 2.1 | 2.0 | 2.0 | 1.9 | 1.9 |

2.02 Experiment According to the Invention Using the Mixture K2+P1 with Addition of CaCl$_2$

| Catalyst | | | Salt | |
|---|---|---|---|---|
| | | Amount of | | |
| | Amount/mg | active compound/mol | Type | Amount/mg |
| K2 + P1 | 32.8 | 23.6 · 10$^{-6}$ | CaCl$_2$ | 800 |

| | Reaction time/min | | | | | |
|---|---|---|---|---|---|---|
| Analytic data | 0 | 30 | 60 | 90 | 180 | 420 |
| $M_w$/(kg/mol) | 186 | 47.5 | 42.4 | 37.2 | 36.7 | 37.1 |
| $M_n$/(kg/mol) | 60.0 | 24.0 | 20.4 | 17.7 | 18.9 | 18.6 |
| PDI | 3.1 | 2.0 | 2.0 | 2.1 | 1.9 | 1.9 |

3.00 Experiments According to the Invention Using the Mixture K3+P1

3.01 Experiment According to the Invention Using the Mixture K3+P1 without addition of a salt

| Catalyst | | | Salt | |
|---|---|---|---|---|
| | | Amount of | | |
| | Amount/mg | active compound/mol | Type | Amount/mg |
| K3 + P1 | 32.8 | 23.6 · 10$^{-6}$ | — | — |

| | Reaction time/min | | | | | |
|---|---|---|---|---|---|---|
| Analytic data | 0 | 30 | 60 | 90 | 180 | 420 |
| $M_w$/(kg/mol) | 186 | 55.3 | 63.8 | 62.5 | 58.9 | 59.1 |
| $M_n$/(kg/mol) | 60.0 | 25.1 | 27.8 | 27.1 | 24.6 | 25.4 |
| PDI | 3.1 | 2.2 | 2.3 | 2.3 | 2.4 | 2.3 |

3.02 Experiment According to the Invention Using the Mixture K3+P1 with Addition of CaCl$_2$

| Catalyst | | | Salt | |
|---|---|---|---|---|
| | | Amount of | | |
| | Amount/mg | active compound/mol | Type | Amount/mg |
| K3 + P1 | 32.8 | 23.6 · 10$^{-6}$ | CaCl$_2$ | 800 |

| | Reaction time/min | | | | | |
|---|---|---|---|---|---|---|
| Analytic data | 0 | 30 | 60 | 90 | 180 | 420 |
| $M_w$/(kg/mol) | 186 | 37.7 | 33.4 | 29.5 | 25.7 | 23.2 |
| $M_n$/(kg/mol) | 60.0 | 20.0 | 17.6 | 16.5 | 13.0 | 11.3 |
| PDI | 3.1 | 1.9 | 1.9 | 1.8 | 2.0 | 2.0 |

4.00 Experiments According to the Invention Using the Mixture K4+P1

4.01 Experiment According to the Invention Using the Mixture K4+P1 without Addition of a Salt

| Catalyst | | | Salt | |
|---|---|---|---|---|
| | | Amount of | | |
| | Amount/mg | active compound/mol | Type | Amount/mg |
| K4 + P1 | 33.1 | 23.6 · 10$^{-6}$ | — | — |

| | Reaction time/min | | | | | |
|---|---|---|---|---|---|---|
| Analytic data | 0 | 30 | 60 | 90 | 180 | 420 |
| $M_w$/(kg/mol) | 186 | 78.1 | 77.2 | 77.6 | 81.1 | 76.9 |
| $M_n$/(kg/mol) | 60.0 | 25.4 | 25.7 | 26.1 | 27.6 | 27.8 |
| PDI | 3.1 | 3.0 | 3.0 | 2.9 | 2.9 | 2.8 |

4.02 Experiment According to the Invention Using the Mixture K4+P1 with Addition of CaCl$_2$

| Catalyst | | | Salt | |
|---|---|---|---|---|
| | | Amount of | | |
| | Amount/mg | active compound/mol | Type | Amount/mg |
| K4 + P1 | 33.1 | 23.6 · 10$^{-6}$ | CaCl$_2$ | 800 |

| | Reaction time/min | | | | | |
|---|---|---|---|---|---|---|
| Analytic data | 0 | 30 | 60 | 90 | 180 | 420 |
| $M_w$/(kg/mol) | 186 | 64.2 | 65.1 | 60.0 | 59.3 | 53.8 |
| $M_n$/(kg/mol) | 60.0 | 20.6 | 21.2 | 21.0 | 21.6 | 17.9 |
| PDI | 3.1 | 3.1 | 3.1 | 2.9 | 2.8 | 3.0 |

5.00 Experiments According to the Invention Using the Mixture K5+P1

5.01 Experiment According to the Invention Using the Mixture K5+P1 without Addition of a Salt

| Catalyst | | | Salt | |
|---|---|---|---|---|
| | | Amount of | | |
| | Amount/mg | active compound/mol | Type | Amount/mg |
| K5 + P1 | 32.9 | 23.6 · 10$^{-6}$ | — | — |

| | Reaction time/min | | | | | |
|---|---|---|---|---|---|---|
| Analytic data | 0 | 30 | 60 | 90 | 180 | 420 |
| $M_w$/(kg/mol) | 186 | 69.5 | 75.8 | 73.6 | 67.0 | 66.9 |
| $M_n$/(kg/mol) | 60.0 | 31.3 | 33.5 | 31.7 | 26.5 | 28.2 |
| PDI | 3.1 | 2.2 | 2.3 | 2.3 | 2.5 | 2.4 |

5.02 Experiment According to the Invention Using the Mixture K5+P1 with Addition of $CaCl_2$

| Catalyst | | | Salt | |
|---|---|---|---|---|
| Amount/mg | Amount of active compound/mol | | Type | Amount/mg |
| K5 + P1 | 32.9 | $23.6 \cdot 10^{-6}$ | $CaCl_2$ | 800 |

| | Reaction time/min | | | | |
|---|---|---|---|---|---|
| Analytic data | 0 | 30 | 60 | 90 | 180 | 420 |
| $M_w$/(kg/mol) | 186 | 39.2 | 33.0 | 29.3 | 24.3 | 21.9 |
| $M_n$/(kg/mol) | 60.0 | 20.1 | 17.7 | 15.4 | 12.2 | 11.3 |
| PDI | 3.1 | 1.9 | 1.9 | 1.9 | 2.0 | 1.9 |

What is claimed is:

1. A ruthenium- or osmium carbene complex catalyst having the general formulae (IIa),

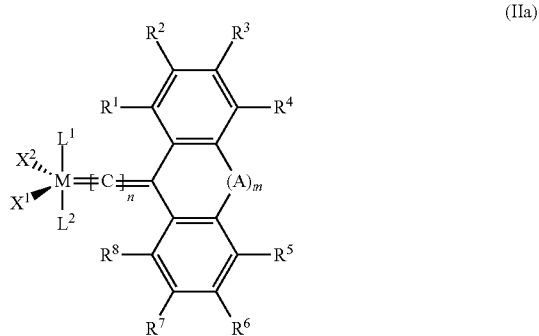

where
M is ruthenium or osmium,
$X^1$ and $X^2$ are identical or different and are two ligands,
$L^1$ and $L^2$ are identical or different ligands, where $L^2$ can alternatively also be bridged by the radical $R^8$,
n is 0,
$R^1$-$R^8$ are identical or different and are each hydrogen, halogen, hydroxyl, aldehyde, keto, thiol, $CF_3$, nitro, nitroso, cyano, thiocyano, isocyanato, carbodiimide, carbamate, thiocarbamate, dithiocarbamate, amino, amido, imino, silyl, sulphonate ($-SO_3^-$), $-OSO_3^-$, $-PO_3^-$ or $OPO_3^-$ or alkyl, cycloalkyl, alkenyl, alkynyl, aryl, carboxylate, alkoxy, alkenyloxy, alkynyloxy, aryloxy, alkoxycarbonyl, alkylamino, alkylthio, arylthio, alkylsulphonyl, alkylsulphinyl, dialkylamino, alkylsilyl or alkoxysilyl, where these radicals may each optionally be substituted by one or more alkyl, halogen, alkoxy, aryl or heteroaryl radicals or alternatively two directly adjacent radicals from the group $R^1$-$R^8$ together with the ring carbons to which they are bound form, by bridging, a cyclic group, preferably an aromatic system, or alternatively $R^8$ can be bridged to another ligand of the ruthenium- or osmium-carbene complex catalyst
m is 0 or 1, and
A is oxygen, sulphur, $C(R^9R^{10})$, $N-R^{11}$, $-C(R^{12})=C(R^{13})-$, $-C(R^{12})(R^{14})-C(R^{13})(R^{15})-$, where $R^9$-$R^{15}$ are identical or different and each have one of the meanings of the radicals $R^1$-$R^8$.

2. The catalyst according to claim 1, wherein
$X^1$ and $X^2$ are identical or different and are two anionic ligands,
$L^1$ and $L^2$ are identical or different uncharged electron donor ligands, where $L^2$ can alternatively also be bridged by the radical $R^8$, and
n is 0.

3. The catalyst according to claim 1, wherein $X^1$ and $X^2$ are identical or different and are each hydrogen, halogen, pseudohalogen, a straight-chain or branched $C_1$-$C_{30}$-alkyl, $C_6$-$C_{24}$-aryl, $C_1$-$C_{20}$-alkoxy, $C_6$-$C_{24}$-aryloxy, $C_3$-$C_{20}$-alkyldiketonate, $C_6$-$C_{24}$-aryldiketonate, $C_1$-$C_{20}$-carboxylate, $C_1$-$C_{20}$-alkylsulphonate, $C_6$-$C_{24}$-arylsulphonate, $C_1$-$C_{20}$-alkylthiol, $C_6$-$C_{24}$-arylthiol, $C_1$-$C_{20}$-alkylsulphonyl or $C_1$-$C_{20}$-alkylsulphinyl radical.

4. The catalyst according to claim 1, wherein $X^1$ and $X^2$ are identical or different and are each halogen, benzoate, $C_1$-$C_5$-carboxylate, $C_1$-$C_5$-alkyl, phenoxy, $C_1$-$C_5$-alkoxy, $C_1$-$C_5$-alkylthiol, $C_6$-$C_{24}$-arylthiol, $C_6$-$C_{24}$-aryl or $C_1$-$C_5$-alkylsulphonate.

5. The catalyst according to claim 1, wherein $X^1$ and $X^2$ are identical and are each chlorine, $CF_3COO$, $CH_3COO$, $CFH_2COO$, $(CH_3)_3CO$, $(CF_3)_2(CH_3)CO$, $(CF_3)(CH_3)_2CO$, PhO (phenoxy), MeO (methoxy), EtO (ethoxy), tosylate (p-$CH_3$—$C_6H_4$—$SO_3$), mesylate (2,4,6-trimethylphenyl) or $CF_3SO_3$ (trifluoromethanesulphonate).

6. The catalyst according to claim 1, wherein the two ligands $L^1$ and $L^2$ are each, independently of one another, a phosphine, sulphonated phosphine, phosphate, phosphinite, phosphonite, arsine, stibine, ether, amine, amide, sulphoxide, carboxyl, nitrosyl, pyridine, thioether or imidazolidine ("Im") ligand.

7. The catalyst according to claim 6, wherein one or both ligands $L^1$ and $L^2$ is/are a pyridine ligand, a picoline ($\alpha$-, $\beta$- and $\gamma$-picoline), lutidine (2,3-, 2,4-, 2,5-, 2,6-, 3,4- and 3,5-lutidine), collidine (2,4,6-trimethylpyridine), trifluoromethylpyridine, phenylpyridine, 4-(dimethylamino)pyridine, chloropyridine (2-, 3- and 4-chlorpyridine), bromopyridine (2-, 3- and 4-bromopyridine), nitropyridine (2-, 3- and 4-nitropyridine), quinoline, pyrimidine, pyrrole, imidazole and phenylimidazole.

8. The catalyst according to claim 6, wherein one or both ligands $L^1$ and $L^2$ is/are an imidazolidine radical (Im) having a structure of the general formula (XIa) or (XIb),

where
$R^{16}$, $R^{17}$, $R^{18}$, $R^{19}$ are identical or different and are hydrogen, straight-chain or branched $C_1$-$C_{30}$-alkyl, $C_3$-$C_{20}$-cycloalkyl, $C_2$-$C_{20}$-alkenyl, $C_2$-$C_{20}$-alkynyl, $C_6$-$C_{24}$-aryl, $C_1$-$C_{20}$-carboxylate, $C_1$-$C_{20}$-alkoxy, $C_2$-$C_{20}$-alkenyloxy, $C_2$-$C_{20}$-alkynyloxy, $C_6$-$C_{20}$-aryloxy, $C_2$-$C_{20}$-alkoxycarbonyl, $C_1$-$C_{20}$-alkylthio, $C_6$-$C_{20}$- arylthio, $C_1$-$C_{20}$-alkylsulphonyl, $C_1$-$C_{20}$-alkylsulphonate, $C_6$-$C_{20}$-arylsulphonate or $C_1$-$C_{20}$-alkylsulphinyl and the abovementioned radicals may optionally be monosubstituted or polysubstituted.

9. The catalyst according to claim 8, wherein one or both ligands $L^1$ and $L^2$ is/are an imidazolidine radical (Im) having a structure of one of the general formulae (XIIa)-(XIIf), where Ph is a phenyl radical, Bu is a butyl radical and Mes is in each case 2,4,6-trimethylphenyl or alternatively in all cases 2,6-diisopropylphenyl

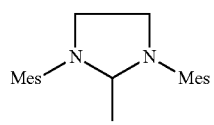
(XIIa)

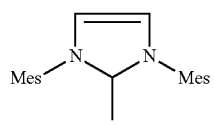
(XIIb)

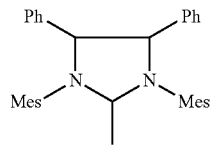
(XIIc)

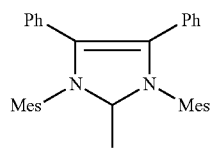
(XIId)

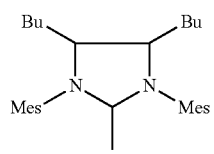
(XIIe)

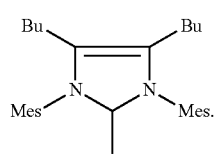
(XIIf)

10. The catalyst according to claim 1 of the general formula (IIa) in which M is ruthenium, $X^1$ and $X^2$ are both halogen, n is 0, $L^1$ and $L^2$ have the meanings mentioned for the general formulae (IIa), $R^1$-$R^8$ have the meanings mentioned for the general formulae (IIa), m is either 0 or 1, and, when m=1, A is oxygen, sulphur, $C(C_1$-$C_{10}$-alkyl$)_2$, —$C(C_1$-$C_{10}$-alkyl$)_2$-$C(C_1$-$C_{10}$-alkyl$)_2$-, —$C(C_1$-$C_{10}$-alkyl$)=C(C_1$-$C_{10}$-alkyl)- or —$N(C_1$-$C_{10}$-alkyl).

11. The catalyst according to claim 1 of the general formula (IIa) in which M is ruthenium, $X^1$ and $X^2$ are both chlorine, n is 0, $L^1$ is an imidazolidine radical having one of the formulae (XIIa) to (XIIf), $L^2$ is a sulphonated phosphine, phosphate, phosphinite, phosphonite, arsine, stibine, ether, amine, amide, sulphoxide, carboxyl, nitrosyl, pyridine radical, an imidazolidine radical having one of the formulae (XIIa) to (XIIf) or a phosphine ligand, $R^1$-$R^8$ have the meanings mentioned for the general formulae (IIa), m is either 0 or 1, and, when m=1, A is oxygen, sulphur, $C(C_1$-$C_{10}$-alkyl$)_2$, —$C(C_1$-$C_{10}$-alkyl$)_2$-$C(C_1$-$C_{10}$-alkyl$)_2$-, —$C(C_1$-$C_{10}$-alkyl$)=C(C_1$-$C_{10}$-alkyl)- or —$N(C_1$-$C_{10}$-alkyl).

12. The catalyst according to claim 11 of the general formula (IIa) in which $L^2$ is $PPh_3$, $P(p$-Tol$)_3$, $P(o$-Tol$)_3$, $PPh(CH_3)_2$, $P(CF_3)_3$, $P(p$-FC$_6$H$_4)_3$, $P(p$-CF$_3$C$_6$H$_4)_3$, $P(C_6H_4$—$SO_3Na)_3$, $P(CH_2C_6H_4$—$SO_3Na)_3$, $P(isopropyl)_3$, $P(CHCH_3(CH_2CH_3))_3$, $P(cyclopentyl)_3$, $P(cyclohexyl)_3$, $P(neopentyl)_3$ or $P(neophenyl)_3$.

13. The catalyst according to claim 1, wherein the radical $R^8$ is bridged to another ligand of the complex catalyst to form a structure of the general formula (XIIIa)

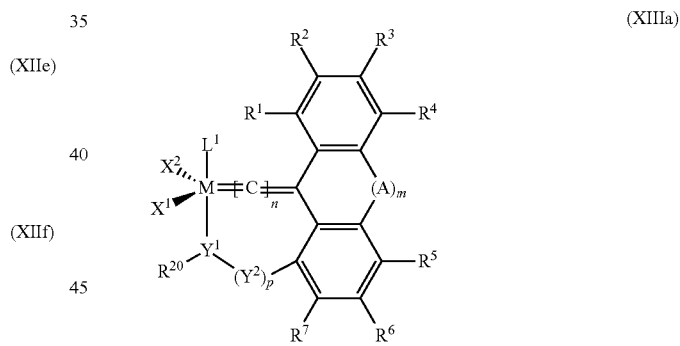
(XIIIa)

where $Y^1$ is oxygen, sulphur, an N—$R^{21}$ radical or a P—$R^{21}$ radical, where $R^{21}$ is as defined below, $R^{20}$ and $R^{21}$ are identical or different and are each an alkyl, cycloalkyl, alkenyl, alkynyl, aryl, alkoxy, alkenyloxy, alkynyloxy, aryloxy, alkoxycarbonyl, alkylamino, alkylthio, arylthio, alkylsulphonyl or alkylsulphinyl radical which may all optionally be substituted by one or more alkyl, halogen, alkoxy, aryl or heteroaryl radicals, p is 0 or 1 and $Y^2$ is, when p=1, —$(CH_2)_r$— where r=1, 2 or 3, —C(=O)—$CH_2$—, —C(=O)—, —N=CH—, —N(H)—C(=O)— or alternatively the overall structural unit "—$Y^1(R^{20})$—$(Y^2)_p$—" is (—$N(R^{20})$=CH—$CH_2$—), and M, $X^1$, $X^2$, $L^1$, $R^1$-$R^8$, A, m and n have the same meanings as in the general formulae (IIa).

14. A catalyst having the following structural formulae
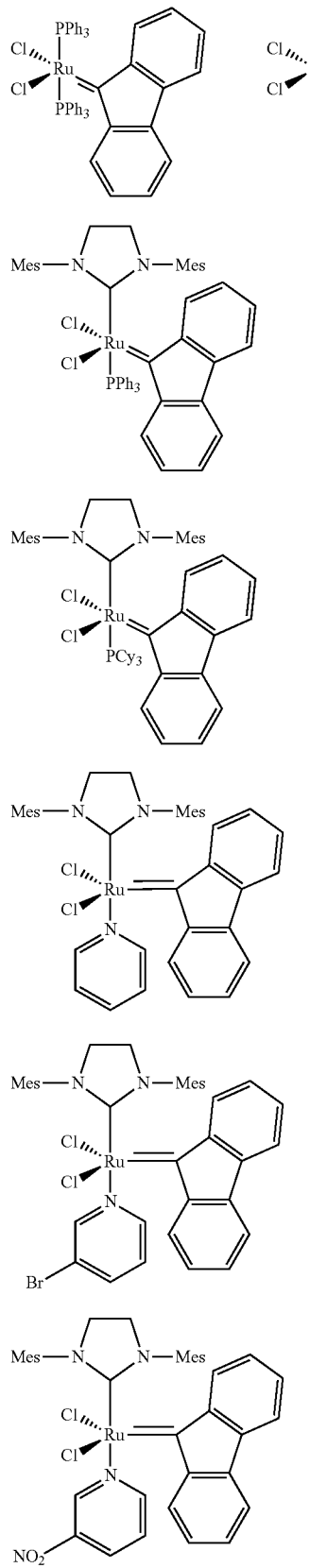
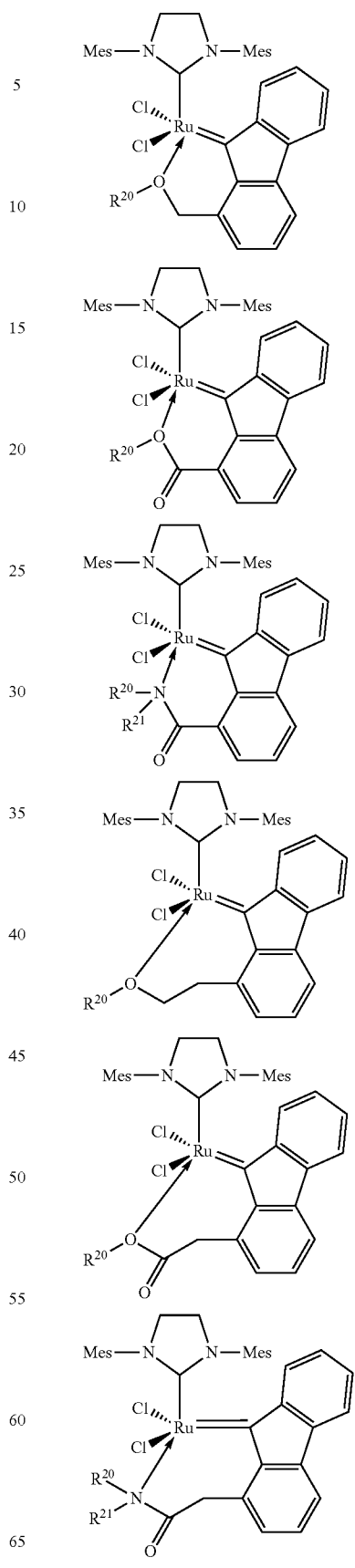
-continued

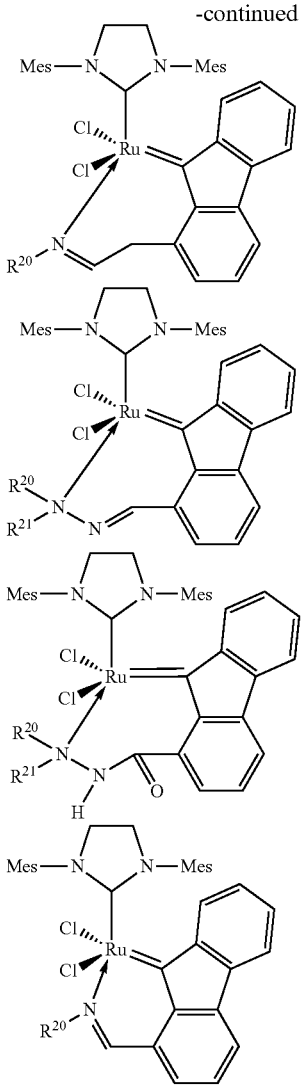

where Mes is in each case 2,4,6-trimethylphenyl, Ph is a phenyl radical, Cy is a cyclohexyl radical, and $R^{20}$ and $R^{21}$ are identical or different and are each an alkyl, cycloalkyl, alkenyl, alkynyl, aryl, alkoxy, alkenyloxy, alkynyloxy, aryloxy, alkoxycarbonyl, alkylamino, alkylthio, arylthio, alkylsulphonyl or alkylsulphinyl radical which may all optionally be substituted by one or more alkyl, halogen, alkoxy, aryl or heteroaryl radicals.

15. A process for preparing catalysts of the general formulae (IIa) according to claim 1, wherein a catalyst precursor compound of the general formula (XVII),

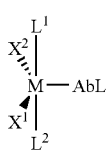

(XVII)

where

M, $X^1$, $X^2$, $L^1$ and $L^2$ have the same meanings as in the general formulae (IIa) and AbL is a "leaving ligand" and has the same meanings as $L^1$ and $L^2$ in the general formula (IIa), is reacted with a compound of the general formula (XVI)

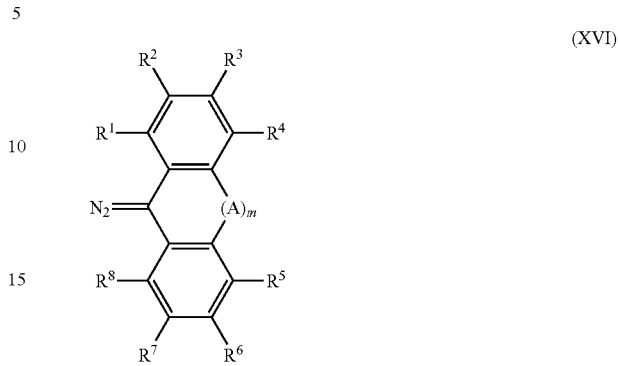

where $R^1$-$R^8$, m and A have the meanings mentioned in claim 1, at a temperature in the range from −20° C. to 100° C. and a molar ratio of the catalyst precursor compound of the general formula (XVII) to the compound of the general formula (XVI) of from 1:0.5 to 1:5.

16. A method of subjecting a chemical compound to a metathesis reaction by bringing such compound into contact with the catalyst according to claim 1.

17. The method according to claim 16, wherein the metathesis reaction is a ring-closing metatheses (RCM), a cross metatheses (CM), a ring-opening metatheses (ROM), a ring-opening metathesis polymerization (ROMP), a cyclic diene metathesis polymerization (ADMET), a self-metatheses, a reaction of alkenes with alkynes (enyne reactions), a polymerization of alkynes or an olefinization of carbonyls.

18. The method according to claim 16, wherein the catalyst is brought into contact with a nitrile rubber, thereby decreasing the molecular weight of said nitrile rubber.

19. The method according to claim 18, wherein the amount of catalyst based on the nitrile rubber used is from 1 to 1 000 ppm of noble metal.

20. The method according to claim 18, wherein a copolymer or terpolymer containing repeating units of at least one conjugated diene, at least one α,β-unsaturated nitrile and, optionally, one or more further copolymerizable monomers is used as nitrile rubber.

21. The method according to claim 18, wherein a copolymer or terpolymer containing repeating units of at least one conjugated diene, at least one α,β-unsaturated nitrile and, optionally, one or more further copolymerizable monomers selected from the group consisting of fumaric acid, maleic acid, acrylic acid, methacrylic acid, methyl acrylate, ethyl acrylate, butyl acrylate, butyl methacrylate, 2-ethylhexyl acrylate, 2-ethylhexyl methacrylate, octyl acrylate, methoxyethyl (meth)acrylate, ethoxyethyl (meth)acrylate and methoxyethyl (meth)acrylate, is used as nitrile rubber.

22. The method according to claim 18, wherein a hydrogenation reaction is performed subsequent to the reduction in molecular weight of the nitrile rubberic followed by a hydrogenation.

23. The catalyst according to claim 1 where $L^1$ and $L^2$ are uncharged electron donors.

24. The process for preparing catalysts of the general formulae (IIa) according to claim 15, where AbL is a phosphine ligand.

25. The catalyst of claim 8 where $R^{16}$, $R^{17}$, $R^{18}$, $R^{19}$ substituents may be substituted by one or more radicals which are selected from the group consisting of halogen, $C_1$-$C_5$-alkyl, $C_1$-$C_5$-alkoxy and phenyl.

26. The catalyst of claim 25 where $R^{16}$, $R^{17}$, $R^{18}$, $R^{19}$ substituents may be substituted by one or more radicals which are selected from the group consisting of chlorine and bromine.

* * * * *